(12) United States Patent
Fujita et al.

(10) Patent No.: US 7,363,311 B2
(45) Date of Patent: Apr. 22, 2008

(54) METHOD OF, APPARATUS FOR, AND COMPUTER PROGRAM FOR MAPPING CONTENTS HAVING META-INFORMATION

(75) Inventors: Etsuro Fujita, Yokohama (JP); Shinji Miyahara, Yokohama (JP); Shinji Abe, Yokosuka (JP); Yasuhito Hayashi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 313 days.

(21) Appl. No.: 10/294,724

(22) Filed: Nov. 15, 2002

(65) Prior Publication Data

US 2003/0093432 A1 May 15, 2003

(30) Foreign Application Priority Data

Nov. 16, 2001 (JP) ............................. 2001-352056
Mar. 1, 2002 (JP) ............................. 2002-055461

(51) Int. Cl.
*G06F 7/00* (2006.01)

(52) U.S. Cl. ...................... 707/102; 707/100; 707/101
(58) Field of Classification Search .......... 707/1–104.1
See application file for complete search history.

(56) References Cited

U.S. PATENT DOCUMENTS

| 5,325,298 | A | * | 6/1994 | Gallant | ........................... 704/9 |
| 5,751,289 | A | * | 5/1998 | Myers | ........................ 345/419 |
| 5,805,747 | A | * | 9/1998 | Bradford | .................... 382/310 |
| 6,029,195 | A | * | 2/2000 | Herz | ........................... 725/116 |
| 6,453,246 | B1 | * | 9/2002 | Agrafiotis et al. | ............. 702/27 |
| 6,523,026 | B1 | * | 2/2003 | Gillis | ............................. 707/3 |
| 6,571,227 | B1 | * | 5/2003 | Agrafiotis et al. | ............. 706/15 |
| 6,573,907 | B1 | * | 6/2003 | Madrane | ...................... 715/719 |
| 6,629,097 | B1 | * | 9/2003 | Keith | ............................. 707/5 |
| 6,675,174 | B1 | * | 1/2004 | Bolle et al. | .............. 707/104.1 |

(Continued)

FOREIGN PATENT DOCUMENTS

EP 000559415 A2 * 9/1993

(Continued)

OTHER PUBLICATIONS

J. A. Wise, et al., Proceedings of IEEE Information Visualization '95, pp. 51-58, and p. 140, "Visualizing the Non-Visual: Spatial Analysis and Interaction With Information From Text Documents", 1995, pp. 51-58, 141.

(Continued)

*Primary Examiner*—Don Wong
*Assistant Examiner*—Linh Black
(74) *Attorney, Agent, or Firm*—Oblon, Spivak, McClelland, Maier & Neustadt, P.C.

(57) ABSTRACT

A method of mapping a large number of items of contents each having meta-information to a low dimensional space so that the map of the contents reflects the meta-information. The method includes the steps of assigning a concept vector to each item of contents, adjusting the distance between two items of contents so that the closer the classification information of the two items of contents match, the more the distance is reduced, and assigning position information in the low dimensional space to each item of contents based on the adjusted distance.

38 Claims, 23 Drawing Sheets

U.S. PATENT DOCUMENTS

| | | | |
|---|---|---|---|
| 6,778,971 B1 * | 8/2004 | Altschuler et al. | 706/55 |
| 6,785,667 B2 * | 8/2004 | Orbanes et al. | 707/1 |
| 2002/0069043 A1 * | 6/2002 | Agrafiotis et al. | 703/22 |
| 2002/0087567 A1 * | 7/2002 | Spiegler et al. | 707/100 |
| 2002/0129015 A1 * | 9/2002 | Caudill et al. | 707/6 |

FOREIGN PATENT DOCUMENTS

| | | |
|---|---|---|
| JP | 2001-36875 | 2/2001 |
| JP | 2001-229167 | 8/2001 |
| JP | 2002-157269 | 5/2002 |
| JP | 2002-175321 | 6/2002 |

OTHER PUBLICATIONS

M. Kumamoto, et al., Technical Report of IEICE, AI98-63, pp. 9-16, "An Application of Concept Bases to Information Retrieval—An Evaluation on Characteristics of Information Retrieval Using Concept Bases", Jan. 2001 (with English Abstract), 1 page.

J. W. Sammon, Jr., IEEE Transactions on Computers, vol. C-18, No. 5, pp. 401-409, "A Nonlinear Mapping for Data Structure Analysis", May 1969, pp. 401-409.

S. Inoue, et al., Proceedings of the 2000 IEICE General Conference, 4 pages, "Associaview: An Information Browsing System Based on Associative Relation", Mar. 28-31, 2000 (with English translation), pp. 1-3.

S. Abe, et al., IPSJ Symposium Series, vol. 2001, No. 5, pp. 75-82, "Information Browser Associaview", Mar. 5-6, 2001 (with English Abstract), 1 page.

E. Fujita, et al., Proceedings of the 2001 IEICE General Conference, "An Audience Rating Analysis Based on Visualization of Contents Space" Mar. 26-29, 2001 (with English translation), pp. 1-3.

* cited by examiner

FIG.12A

FIRST LEVEL
DISTANCE MATRIX

| A₁ | B₁ | B₁ |
| B₁ | A₁ | B₁ |
| B₁ | B₁ | A₁ |

$A_1 < 1, B_1 \geq 1$

FIG.12B

SECOND LEVEL
DISTANCE MATRIX

| A₂ | B₂ | B₂ |
| B₂ | A₂ | B₂ |
| B₂ | B₂ | A₂ |

$A_2 < 1, B_2 \geq 1$

FIG.12C

THRD LEVEL
DISTANCE MATRIX

| A₃ | B₃ | B₃ |
| B₃ | A₃ | B₃ |
| B₃ | B₃ | A₃ |

$A_3 < 1, B_3 \geq 1$

FIG.13

| CLASSIFICATION CATEGORY OF CONTENT ITEM i | CLASSIFICATION CATEGORY OF CONTENT ITEM j | w |
|---|---|---|
| L111 | L111 | $A_1 \times A_2 \times A_3$ |
| L111 | L112 | $A_1 \times A_2 \times B_3$ |
| L111 | L113 | $A_1 \times A_2 \times B_3$ |
| L111 | L121 | $A_1 \times B_2$ |
| L111 | L122 | $A_1 \times B_2$ |
| L111 | L123 | $A_1 \times B_2$ |
| L111 | L131 | $A_1 \times B_2$ |
| L111 | L132 | $A_1 \times B_2$ |
| L111 | L133 | $A_1 \times B_2$ |
| L111 | L211 | $B_1$ |
| L111 | L212 | $B_1$ |
| L111 | L213 | $B_1$ |
| L111 | L221 | $B_1$ |
| L111 | L222 | $B_1$ |
| L111 | L223 | $B_1$ |
| L111 | L231 | $B_1$ |
| L111 | L232 | $B_1$ |
| L111 | L233 | $B_1$ |
| ⋮ | ⋮ | ⋮ |

METHOD OF, APPARATUS FOR, AND COMPUTER PROGRAM FOR MAPPING CONTENTS HAVING META-INFORMATION

BACKGROUND OF THE INVENTION

1. Field of the Invention

The present invention relates to a method of mapping contents having meta-information, and more particularly, to a method of and an apparatus for mapping a large number of items of contents each having meta-information to a low dimensional space such as a two dimensional plane based on the similarity of the contents. The present invention further relates to a computer program that causes a computer to perform the method of mapping contents having meta-information and a recording medium storing the same.

2. Description of the Related Art

The popularization of the Internet and the progress of database technology have enabled personal computer users to use a large number of items of contents (information such as an image, a picture, music, and text information).

As usable items of contents increase in number and variety, however, a user faces a difficulty in efficiently finding out an item of contents that the user desires to use. Users have been long in waiting for a technique that provides an intuitive and easily understandable user interface with which the content users can browse contents with only a simple operation and find the contents that the user desires to use. Especially, content providers who are working to increase the consumption of contents by users by improving the user interface with which the users select contents are also looking for an effective solution to that problem.

Conventionally, a technique in which a large number of items of contents are visually mapped in a two dimensional plane is proposed, for example, in the following document: James A. Wise, et. al. "Visualizing the non-visual: Spatial analysis and interaction with information from text documents", Proc. of IEEE Information Visualization '95, p.51-58 (1995).

The document proposes a technique in which, in the case of text information, a characteristic vector is extracted from each item of text information by quantifying it, and a two dimensional map of the contents is generated based on a set of characteristic vectors by applying multi-dimensional scaling. This technique enables a user to search a desired item of items of contents by browsing a large number of contents mapped in accordance with their similarities in a two dimensional plane.

In the case where the contents are classified based on a prescribed classification hierarchy and a classification category of the classification hierarchy is assigned to each item of contents as meta-information, however, it is effective to use such meta-information for the search of a desired item of contents. Reflecting the meta-information in the mapping of contents makes the search of the desired item of contents easier.

If this mapping method of contents is used for the searching of web pages through a directory service provided by many portal sites, for example, a user can effectively focus on a classification category that the user is interested in.

SUMMARY OF THE INVENTION

Accordingly, it is a general object of the present invention to provide a novel and useful method of mapping contents in a low dimensional space in which one or more of the problems described above are eliminated.

Another and more specific object of the present invention is to provide a method of, an apparatus for, and a computer program for mapping contents (information such as an image, a picture, music, and text information) having classification information in a low dimensional space so that the structure of classification information is reflected in a resulting map of contents such as a scatter diagram. Yet another object of the present invention is to provide a computer readable recording medium storing the computer program according to the present invention.

To achieve one of the above objects according to the present invention, a method of mapping items of contents to a low dimensional space, each item of contents having meta-information including classification information, includes the steps of assigning each item of contents a concept vector, and assigning each item of contents position information in a low dimensional space based on the concept vector assigned to the item of contents, wherein two items of contents are mapped at a short distance to such an extent that classification information of said two items of contents are close to each other.

According to an aspect of the present invention, when contents having meta-information such as a classification category of a classification hierarchy are mapped in a low dimensional space such as a two dimensional plane, a concept vector is assigned to each item of contents, and then, the contents are mapped into a low dimensional space based on the concept vectors. The contents are mapped in a low dimensional space so that the classification information is reflected by adjusting the concept vectors or the position information in a low dimensional space based on the classification information.

In the case where a classification category is assigned to each item of contents, and each item of contents is classified into one of classification categories in a lowest level of a classification hierarchy, the contents can be clustered by each classification category and reflect the structure of the classification hierarchy in a contents map.

According to another aspect of the present invention, the method described above is characterized in that the step of assigning position information in a low dimensional space further includes the steps of, calculating a distance between two items of contents based on concept vectors assigned thereto, adjusting said distance based on classification information of said two items of contents so that said distance is reduced to such an extent that classification information of said two items of contents are close to each other, and assigning each item of contents position information in a low dimensional space based on the adjusted distance.

If two items of contents for which a distance is to be calculated are classified into the same classification category in the first level of the classification hierarchy, the distance is reduced by the adjustment. If the two items of contents are classified into different classification categories in the first level of the classification hierarchy, the distance is not adjusted, or adjusted so that the distance is increased.

In the case where the two items of contents are classified into the same classification category in the first level, it is determined whether the two items of contents are classified into the same classification category in the second level. If the two items of contents are classified into the same classification category in the second level, the distance is adjusted so that the distance is further reduced.

If the two items of contents are classified into the same classification category in the first level, but they are classified into different classification categories in the second level, the distance is not adjusted, or adjusted so that the distance between the two items of contents is increased, but the distance is not increased to the extent that the distance is increased in the case where the classification categories in the first level differ.

These steps are repeated as long as classification categories of the two items of contents match down to the lowest level of the classification hierarchy. The extent of adjustment is determined based on the extent in which the classification categories match. Accordingly, the more the classification categories match, the shorter the distance between the two items of contents becomes.

In another aspect of the present invention, the method described above is further characterized in that the contents are mapped by applying a multi-dimensional scaling method to adjusted distances. Two items of contents that are close in a high dimensional space are mapped to two items that are also close in a low dimensional space such as a two dimensional plane by the multi-dimensional scaling method. Accordingly, the items of contents are clustered in each level of the classification hierarchy.

According to yet another aspect of the present invention, the method described above is further characterized in that
the step of assigning position information in a low dimensional space further includes the steps of
calculating a distance between two items of contents based on concept vectors assigned thereto,
assigning each item of contents position information in a low dimensional space based on the distance, and
adjusting said position information based on classification information of said two items of contents so that the closer the classification information of said two items of contents are, the shorter the distance between the position information of said two items becomes.

In this case, the contents can be clustered in each level of the classification hierarchy after the contents are mapped in a low dimensional space.

Other objects, features, and advantages of the present invention will become more apparent from the following detailed description when read in conjunction with the accompanying drawings.

BRIEF DESCRIPTION OF THE DRAWINGS

FIGS. 12A-12C are schematic diagrams for explaining distance matrices used for the method of mapping contents according to the second embodiment of the present invention;

FIG. 13 is a schematic diagram for explaining an adjustment coefficient used for the method of mapping contents according to the second embodiment of the present invention;

DETAILED DESCRIPTION OF THE PREFERRED EMBODIMENTS

The preferred embodiments of the present invention will be described in detail by reference to the drawings.

First Embodiment

Figure 1:
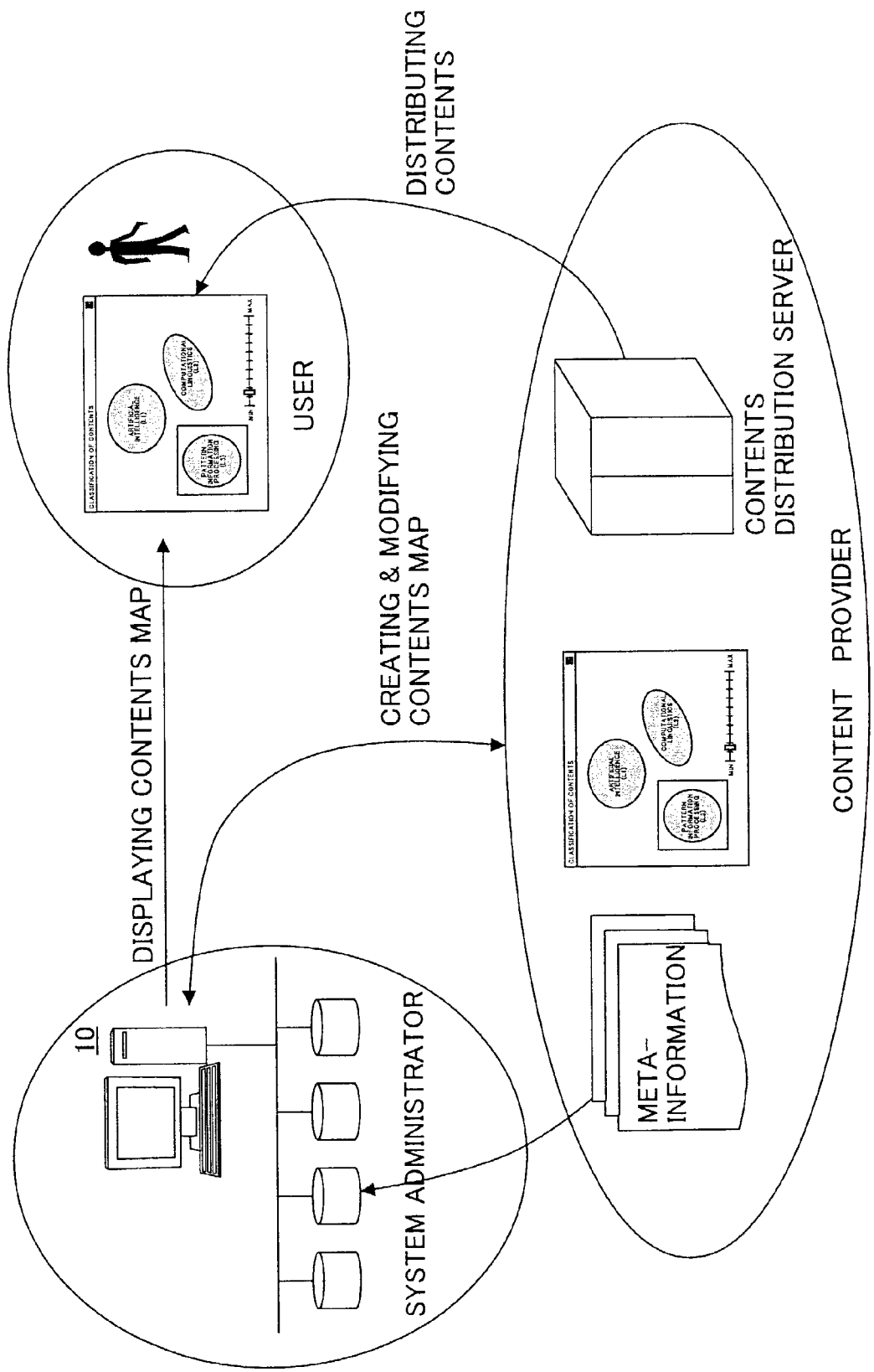
FIG. 1 is a schematic diagram showing a computer network in which the method of mapping contents according to the present invention is implemented.

FIG. 1 is a schematic diagram showing a computer network in which the method of mapping contents according to the first embodiment of the present invention is implemented, and as a result, a map of contents is presented to a user.

The computer network of FIG. 1 includes a system administrator, a content provider, and a user connected to each other via a network such as the Internet.

The system administrator is provided with a server (computer) 10 that performs the method of mapping contents according to the present invention and various databases that are accessed by the server 10. These will be described later in detail.

The content provider is provided with a contents distribution server that distributes contents (information such as an image, a picture, music, and text information) stored therein to users. The content provider has meta-information (classification category of a classification hierarchy, for example) and provides the meta-information to a meta-information database managed by the system administrator via the network.

The content provider can access the server 10 of the system administrator via the network, and create and modify the contents map using the method of mapping contents according to the present invention.

The user can search for an item of contents that the user desires to use by accessing the server 10 of the system administrator via the network and displaying a map of contents created and modified by the content provider on the user's computer. If the user finds an item of contents that the user desires to use, the user can obtain the item of contents from the contents distribution server.

In this detailed description of the preferred embodiments, the term "user" may include a content provider who has an access to the contents mapping system according to the present invention.

Figure 2:
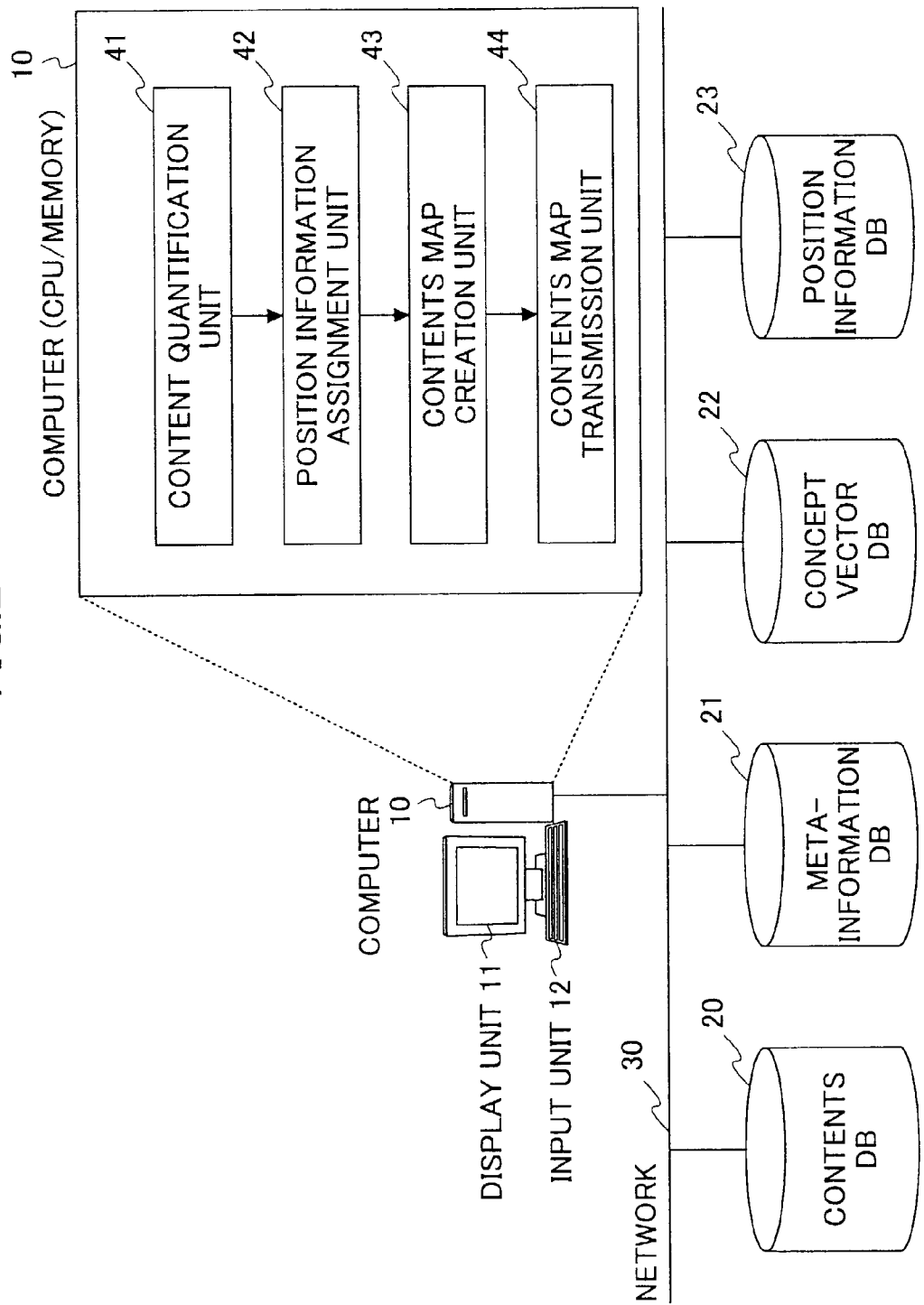
FIG. 2 is a schematic diagram showing a computer system that performs the method of mapping contents according to the present invention.

FIG. 2 is a schematic diagram showing a computer system in which the method of mapping contents according to the first embodiment of the present invention is implemented. The content provider can create and modify the map of contents by accessing this contents mapping system. The method of mapping contents according to the present invention is mainly used in this process. The user can search items of contents that the user desires to use by looking at this map of contents created and modified through this process. The method of mapping contents according to the present invention can be used by the user while the user is searching the items of contents. The method of mapping contents according to the present invention can be used by the system administrator.

The computer system showed in FIG. 2 includes the computer 10, a contents database (DB) 20, a meta-information database (DB) 21, a concept vector database (DB) 22, and a position information database (DB) 23 connected to the computer 10 via the network 30.

Figure 3:
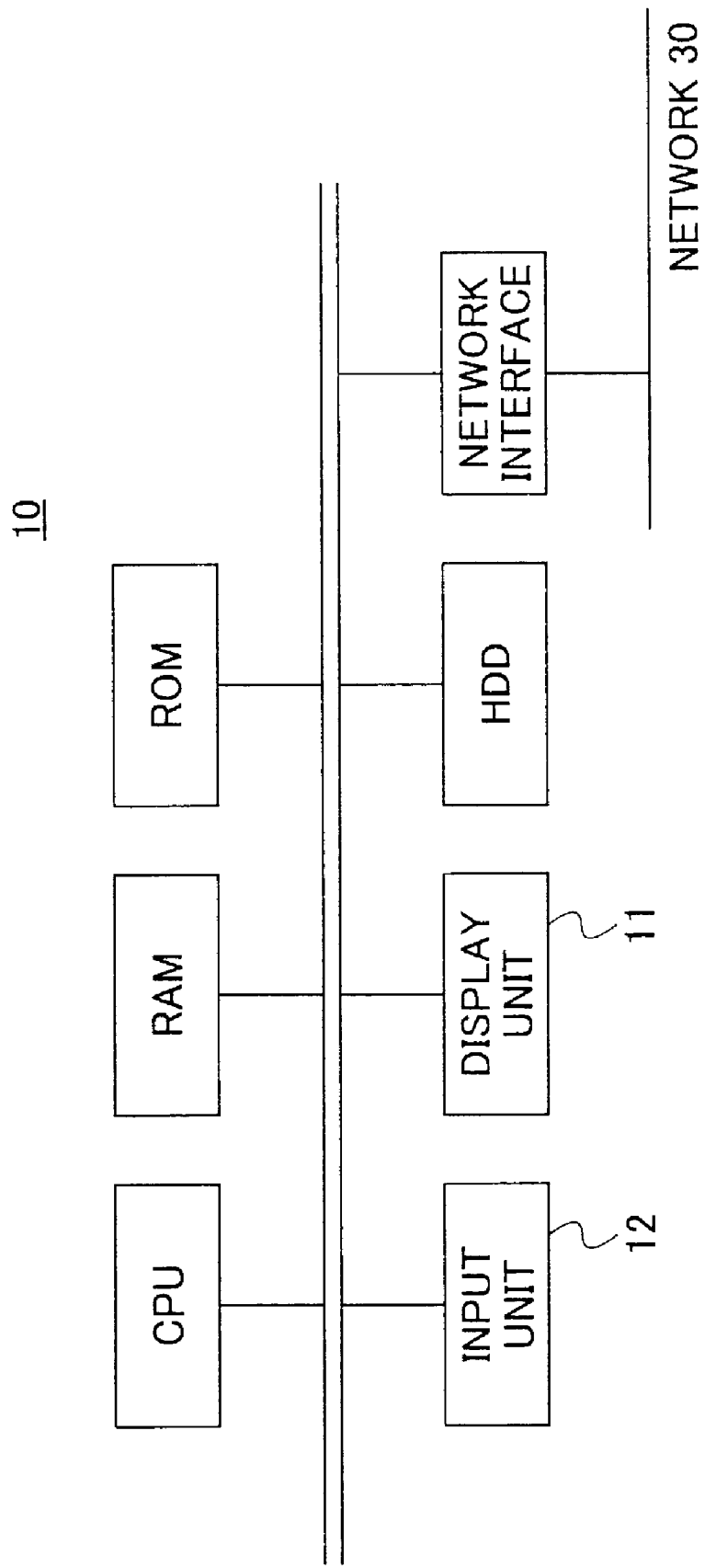
FIG. 3 is a block diagram showing the hardware construction of the computer system showed in FIG. 2.

FIG. 3 is a block diagram showing the hardware construction of the computer 10 that performs the method of mapping contents according to the first embodiment.

The computer 10 includes memory units such as RAM and ROM, a hard disk drive, CPU, a display unit 11, an input unit 12 such as a mouse and a keyboard, and a network interface unit that connects the computer 10 to the network 30. The computer 10 is also provided with a content quantification unit 41, a position information assignment unit 42, a contents map creation unit 43, and a contents map transmission unit 44.

Contents and their brief descriptions are stored in the contents DB 20 of FIG. 2. It is not mandatory to store the contents in the contents DB 20. The contents may be distributed from a contents distribution server as showed in FIG. 1. In this case, the contents mapping system according to the first embodiment may store the brief descriptions of the contents in the meta-information DB 21, and the contents DB 20 may be omitted.

Contents may include images, pictures, music, text information, and so forth. In the following description, documents (text information) regarding knowledge related systems are used as an example of contents. Contents besides text information can be described in the same manner.

Figure 4:
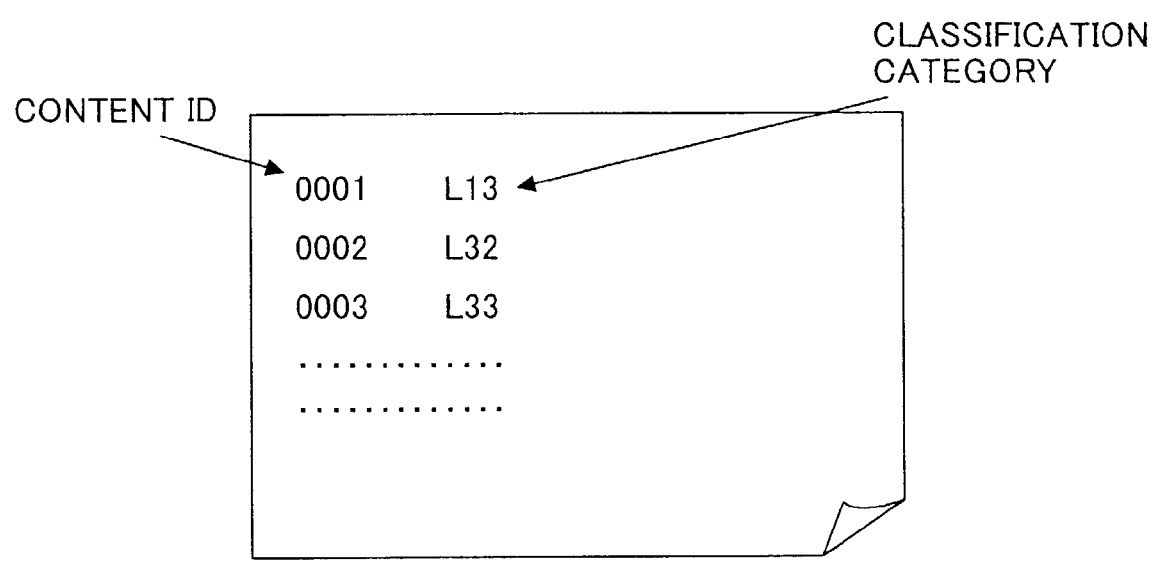
FIG. 4 is a schematic diagram for explaining a meta-information database (DB) according to the first embodiment of the present invention.

As shown in FIG. 4, classification information such as a classification category for classifying the contents is stored in the meta-information DB 21. A classification category is assigned to each item of the contents in accordance with a prescribed classification hierarchy. In this embodiment, the classification hierarchy has two levels, for example.

Figure 5:
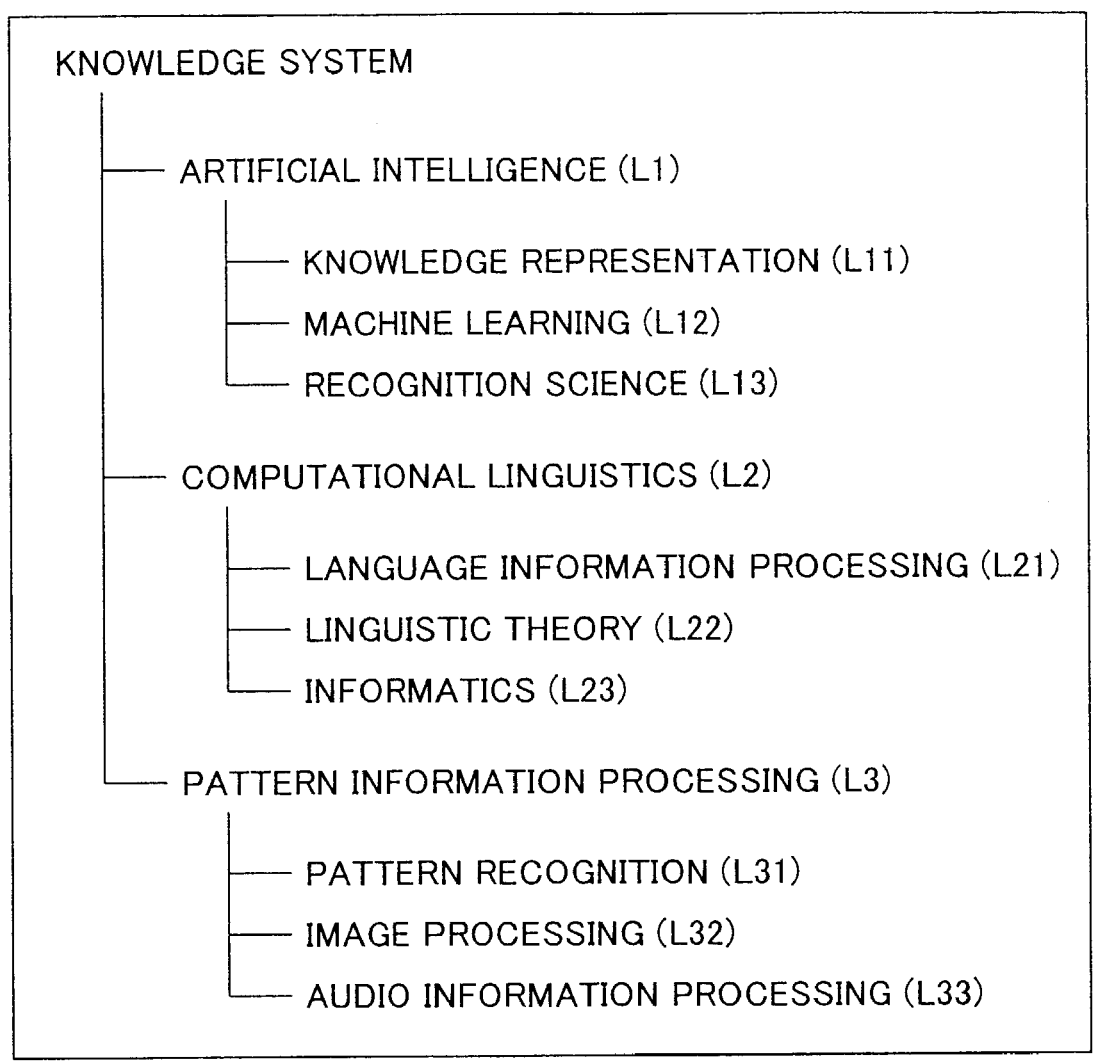
FIG. 5 is a schematic diagram for explaining a classification hierarchy as an example of meta-information according to the first embodiment of the present invention.

The classification categories of a classification hierarchy for classifying the contents is shown in FIG. 5.

In the case of this classification hierarchy, each item of contents stored in the contents DB 20 is classified into one of classification categories $L_{ij}$ (i,j=1,2,3) as shown in FIG. 5. A classification category assigned to each item of contents is stored in the meta-information DB 21.

Figure 6:
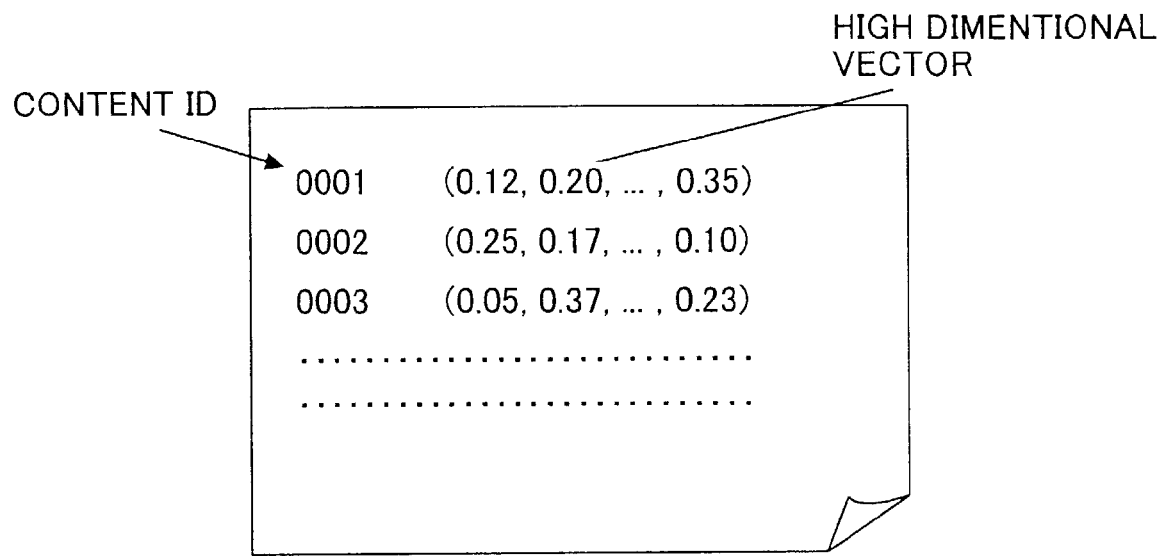
FIG. 6 is a schematic diagram for explaining a concept vector database (DB) according to the first embodiment of the present invention.

A concept vector corresponding to each item of contents is stored, as showed in FIG. 6, for example, in the concept vector DB 22 showed in FIG. 2.

Figure 7:
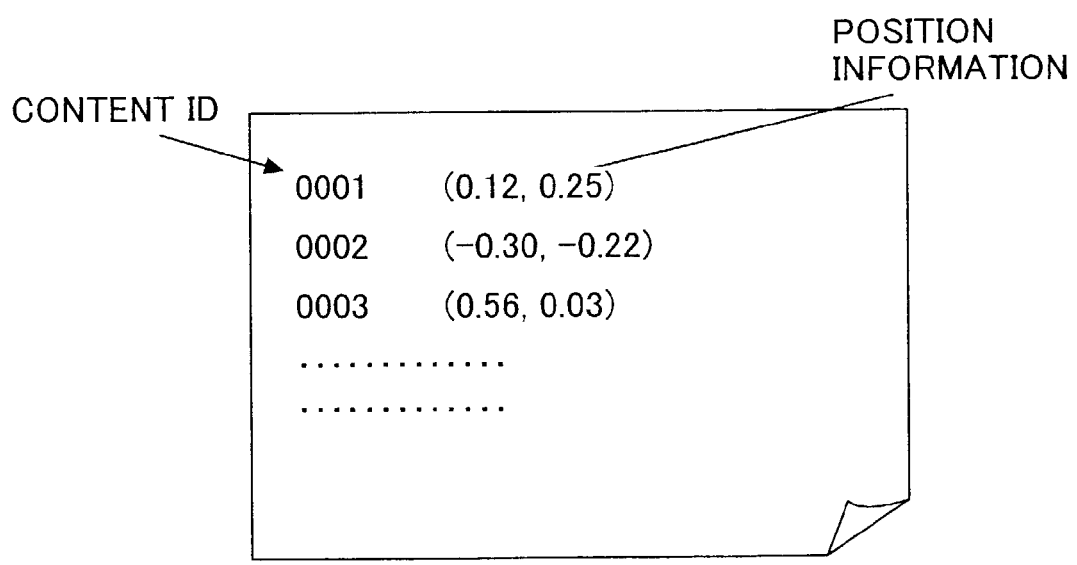
FIG. 7 is a schematic diagram for explaining a position information database (DB) according to the first embodiment of the present invention.

Position information (disposition coordinates) in a two dimensional plane corresponding to each item of contents is stored, as showed in FIG. 7, for example, in the position information DB 23 of FIG. 2.

As described previously, an example of a classification hierarchy for classifying the contents is shown in FIG. 5. This is an example of the classification hierarchy of documents related to knowledge systems. Each document stored in the contents DB 20 is classified into one of the classification categories $L_{ij}$ (i,j=1,2,3) of FIG. 5, the classification category assigned is stored in the meta-information DB 21. In addition, in the case where a brief description of each item of contents is stored in the meta-information DB 21, it is possible to implement the present invention without using the contents DB 20.

The concept quantification unit 41 assigns a concept vector to a brief description of each item of contents stored in the contents DB 20 by quantifying concepts included in the brief description. The position information assignment unit 42 calculates the distance between each combination of two items of contents using the concept vectors calculated by the concept quantification unit 41 and the classification information stored in the meta-information DB 21. The position information assignment unit 42 further calculates the disposition coordinates (position information) of the contents in a two dimensional plane. The contents map creation unit 43 creates a map of contents (scatter diagram) based on the two dimensional disposition coordinates of the contents obtained by the position information assignment unit 42. The contents map transmission unit 44 transmits the map of contents (scatter diagram) created by the contents map creation unit 43 to a user computer via a network so as to display the contents map for a user.

Figure 8:
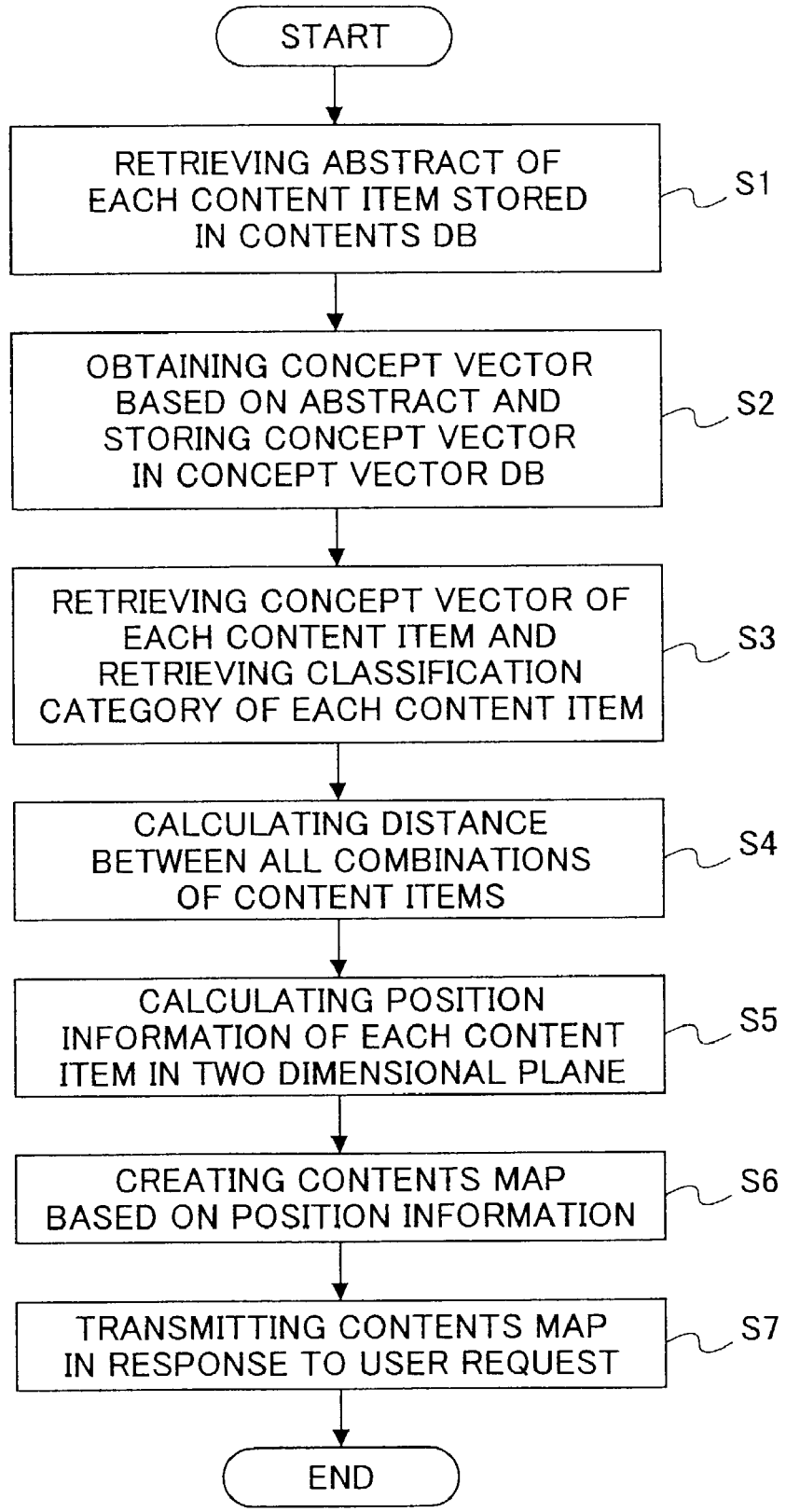
FIG. 8 is a flow diagram showing the method of mapping contents according to the first embodiment of the present invention.

FIG. 8 is a flow diagram showing the operation of the contents mapping system of FIG. 2. Steps of the operation will be described in detail below.

The concept quantification unit 41 retrieves a brief description of each item of contents stored in the contents DB 20 to the memory unit, and generates a concept vector based on the brief description (step S1). A concept vector is a high dimensional real-valued vector. The generated concept vector is stored in the concept vector DB 22 corresponding to each item of contents (step S2).

A word is regarded as a concept vector, that is, a vector in a high dimensional space (concept space) each dimension of which corresponds to a semantic category (meaning). Each element of the concept vector indicates relevance (weight) of the word to the semantic category. For example, the semantic categories include "life", "animal", "plant", "machine", "weights and measures", "vehicle", and "amusement". The concept vector corresponding to a word "horse", for example, has the following elements: (life 0.5, animal 0.3, plant 0, machine 0, weights and measures 0, vehicle 0.3, amusement 0.1, . . . ). The concept vector corresponding to a word "car", for example, has the following elements: (life 0, animal 0, plant 0, machine 0.5, weights and measures 0, vehicle 0.3, amusement 0.2, . . . ). Concept vectors according to this embodiment may be normalized so that the sum of squared elements becomes one. Concept vectors according to another embodiment may not be normalized.

In the case of a brief description of an item of contents, a concept vector is generated, for example, by averaging concept vectors of words included in the brief description and normalizing the concept vector so that the length of the concept vector becomes one.

The method to calculate a concept vector of a brief description of an item of contents is described in detail in the following document: M. Kumamoto, et al., "An Application of Concept Bases to Information Retrieval—An Evaluation on Characteristics of Information Retrieval using Concept Bases", Technical Report of IEICE, AI98-63 (1999-01), the entire content of which is hereby incorporated in reference.

The position information assignment unit 42 retrieves concept vectors stored in the concept vector DB 22 and stores the retrieved concept vectors in the memory unit. The position information assignment unit 42 also retrieves classification information stored in the meta-information DB 21 and stores the retrieved classification information in the memory (step S3). The position information assignment unit 42 calculates distances between all combinations of contents that are to be displayed in the map of contents (step S4). Components that are not displayed in the contents map may not be included in the calculation of distance. If contents to be displayed in the contents map are selected, for example, based on a search condition, only the selected items of contents are used in the calculation of distance.

The effective distance between two arbitrary items of contents $c_i$ and $c_j$ can be calculated by the following formula:

$$disth^*_{ij} = disth_{ij} + u_{ij}$$

"$disth_{ij}$" is the Euclidian distance between the concept vectors of the contents $c_i$ and $c_j$. "$u_{ij}$" (compensative value) is a virtual distance between classification categories of the contents $c_i$ and $c_j$, and is added to the Euclidian distance to compensate it.

Depending on the depth in the classification hierarchy down to which the classification categories of the two contents $c_i$ and $c_j$ match, the compensative value $u_{ij}$ is determined as follows:

$u_{ij}=0$ (if $c_i$, $c_j$ match down to the second level)

$u_{ij}=A$ (if $c_i$, $c_j$ match only to the first level)

$u_{ij}=B$ (if $c_i$, $c_j$ do not match at all)

"A" and "B" are non negative real values satisfying $0<A<B$.

For example, if both items $c_i$ and $c_j$ are classified into the same classification category L21 in FIG. 5, $u_{ij}=0$. If the item $c_i$ is classified into L21, and the item $c_j$ is classified into L22, $u_{ij}=A$. If the item $c_i$ is classified into L21, and the item $c_j$ is classified into L31, $u_{ij}=B$.

In the case of the hierarchy of classification category of FIG. 5, if the items of contents $c_i$ and $c_j$ are classified into the classification categories $L_{mn}$ and $L_{kl}$ (m, n, k, l=1, 2, 3), $u_{ij}$ can be expressed generally as follows:

$u_{ij}=0$ (if $m=k$ and $n=l$)

$u_{ij}=A$ (if $m=k$ and $n \neq l$)

$u_{ij}=B$ (if $m \neq k$)

The example described above is the case where the classification hierarchy has two levels. In the case where the hierarchy of classification categories has N (a positive integer) levels, the compensative value $u_{ij}$ can be defined based on the relationship of the two classification categories in the same manner.

A position information of each item of contents in a two dimensional plane is calculated by multi-dimensional scaling (step S5). The multi-dimensional scaling is an algorithm to compress a high dimensional space to a low dimensional space, and obtains disposition coordinates (position information) that minimize the following objective function:

$$E = \sum_{i=1}^{n-1} \sum_{j=i+1}^{n} (disth^*_{ij} - dist2_{ij})^2 / disth^*_{ij}$$

That is, when a set of disposition coordinates $(x_i, y_i)$ (i=1, 2, ..., n) minimizes the above objective function, each $(x_i, y_i)$ becomes the disposition coordinate of a corresponding item of contents in a two dimensional plane. "$dist2_{ij}$" in the above objective function is defined as $$dist2_{ij} = [(x_i-x_j)^2 + (y_i-y_j)^2]^{1/2}$$

where n is the number of items of contents.

The above minimization problem can be solved by the steepest descent procedure. The steepest descent procedure is described in detail in the following document: J. W. Sammon. A nonlinear mapping for data structure analysis. IEEE Transactions on Computers, C-18(5):401-409 (1969), the entire content of which is incorporated by reference.

Position information $(x_i, y_i)$ (i=1, 2, ..., n) obtained by the steepest descent procedure are stored in the position information DB 23. Because a distance between contents is calculated based on not only the distance between concept vectors but also the distance between classification categories, the position information obtained by multi-dimensional scaling can reflect the classification information of contents.

Accordingly, items of contents included in the same classification category are mapped to a two dimensional plane so that they form a cluster. In the case of FIG. 5, items of contents classified into Li (i=1, 2, 3) are mapped so that they form respective clusters. The content items classified into Lij (i, j=1, 2, 3) are mapped so that they further form respective clusters in the cluster of content items of Li.

The contents map creation unit 43 creates a map of contents (scatter diagram) by retrieving the disposition coordinates (position information) of contents and storing the disposition coordinates (position information) in the memory (step S6). The contents map transmission unit 44 transmits the created map of contents to a user in response to the user's request (step S7).

It is preferable that any region of a map of contents can be enlarged or reduced at an arbitral ratio. It is also preferable that a cluster of contents can be labeled with the title of classification category, for example. Further, it is preferable to make the information indicated in the label selectable in accordance with the scale of the map of contents. For example, if the map of contents is reduced, only the classification category of Li level is indicated in the label. If the map of contents is enlarged by an operation of a user, it is desired that classification category of Lij level be indicated as the label in addition to the Li level information.

That is, the contents map creation unit 43 can enlarge or reduce the map of contents at any ratio in response to the user's request, and the contents map creation unit 43 can change the meta-information to be indicated in the label in accordance with the scale. It is possible to provide a table of information to be indicated in a label of clustering items of contents for each range of the scale and, when a scale is designated by a user, look up information suitable for the scale in the table.

Figure 9:
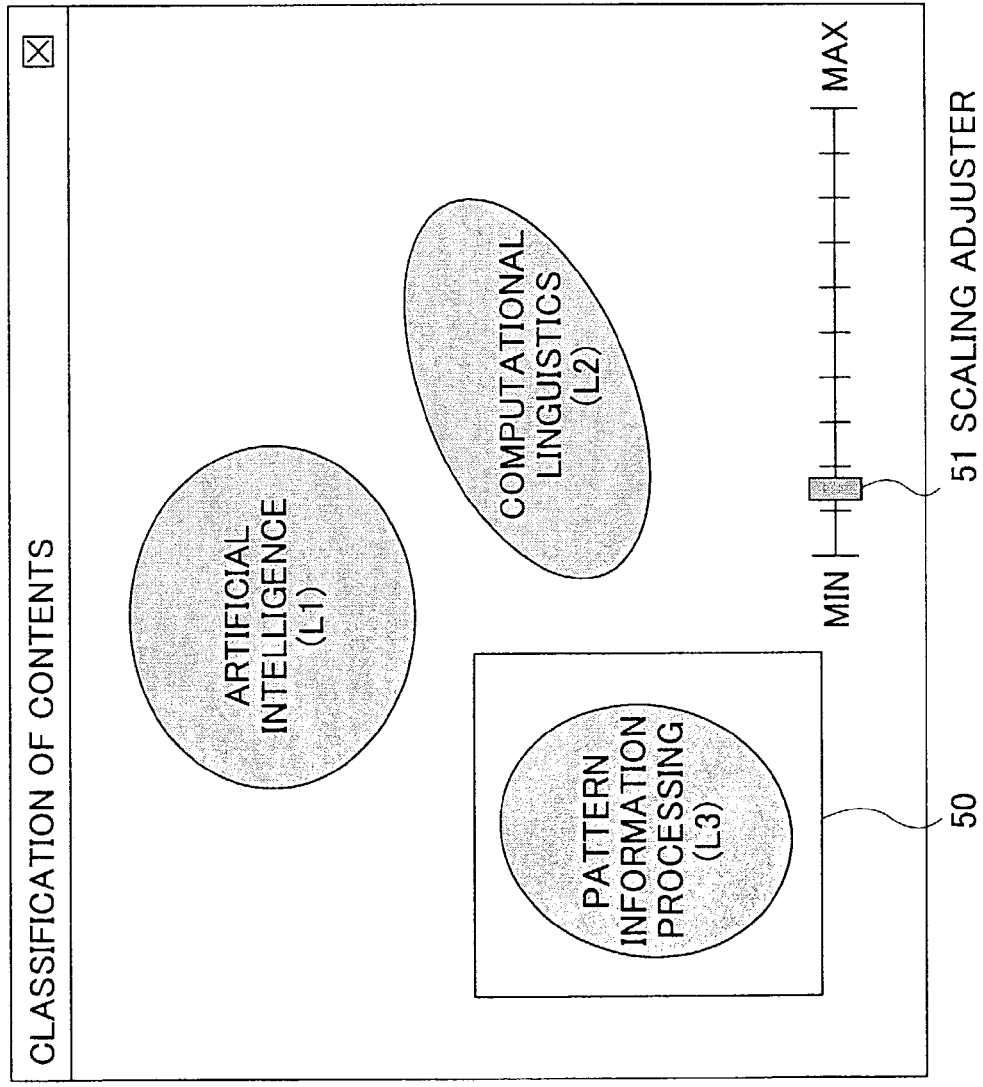
FIG. 9 is an example of a scatter diagram of the first hierarchy according to the first embodiment of the present invention.

An example of map of contents with a reduced scale is showed in FIG. 9. The map of contents of FIG. 9 shows the contents of the Li level that are related to the "knowledge system". In the map of contents of FIG. 9, a specific region of the map of contents can be enlarged by designating a rectangular region 50 and operating a scaling adjuster 51 by a pointing device such as a mouse. A user can enlarge or reduce a specific region by designating the center of the specific region, instead of designating the rectangular region 50.

Figure 10:
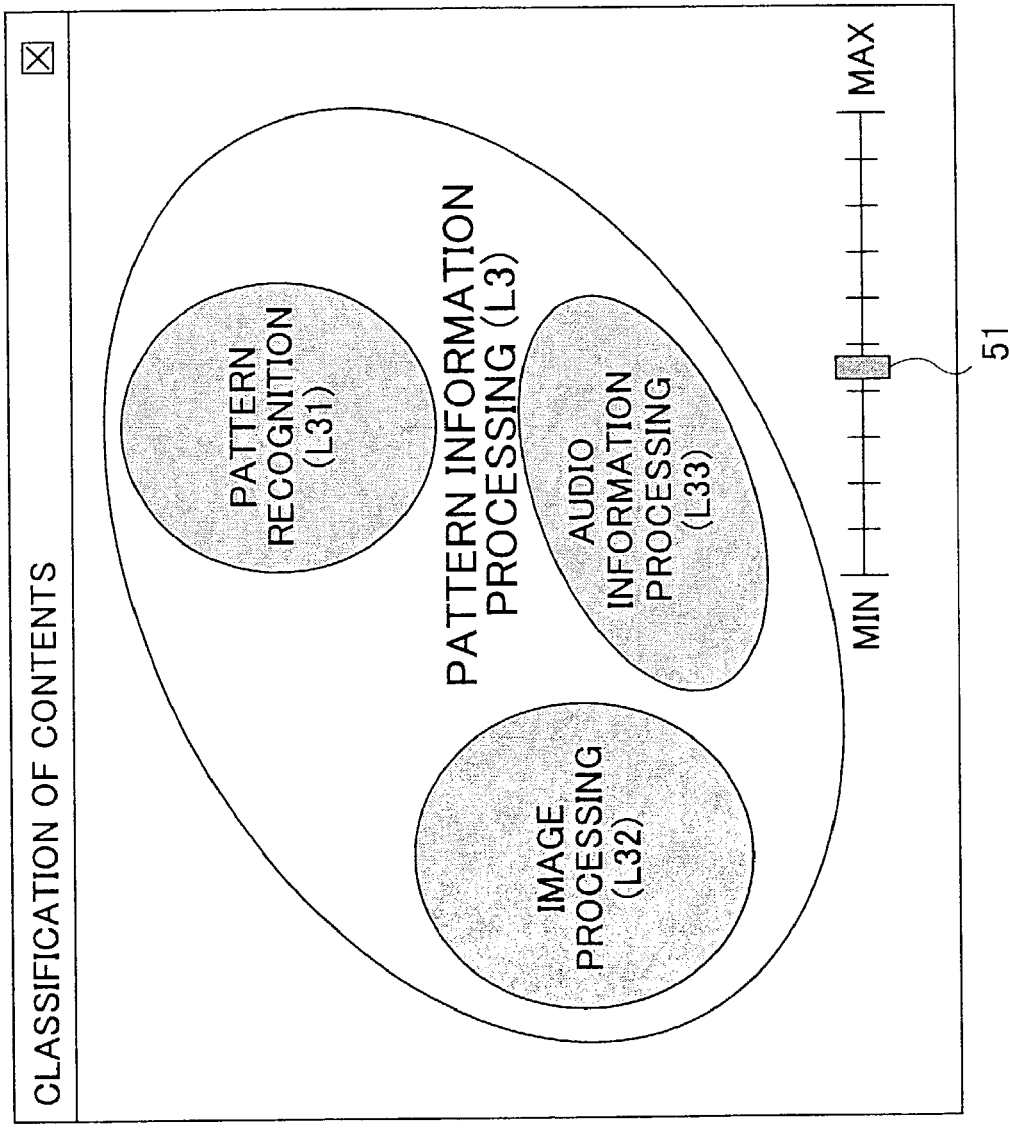
FIG. 10 is an example of a scatter diagram of the second hierarchy according to the first embodiment of the present invention in the case where a classification category "pattern information processing" (L3) of FIG. 9 is selected.

FIG. 10 shows the enlarged rectangular region 50 of the map of contents of FIG. 9. In the map of contents of FIG. 10, three classification categories of level L3j (j=32 1, 2, 3) are shown in the upper level cluster of "pattern information processing" L3. In this example, a category title is indicated as a label. It is possible to indicate various items of meta-information other than the category title. It is preferable that a user can select meta-information of various kinds from a menu.

It is possible to provide scroll bars on the edge of the screen so that the user can scroll the screen vertically and/or horizontally.

If the enlarged map of contents of FIG. 10 is further enlarged to the end, a map of contents indicating individual items of contents disposed in a two dimensional plane is showed. A title, an author's name, and other information related to each item of contents are displayed as a label based on user's setting.

Second Embodiment

The second embodiment of the present invention can reflect the classification information in the calculation of a distance between concept vectors, even if the classification information such as the classification hierarchy has more than two levels.

The contents mapping system according to the second embodiment is similar to the contents mapping system according to the first embodiment. In the following description, only differences between them will be described. A description of components and operations common to both the contents mapping systems will be omitted.

The contents mapping system according to the second embodiment is different from the contents mapping system according to the first embodiment in the step S4 in the flow chart of FIG. 8 in which a distance between contents is calculated.

Figure 11:
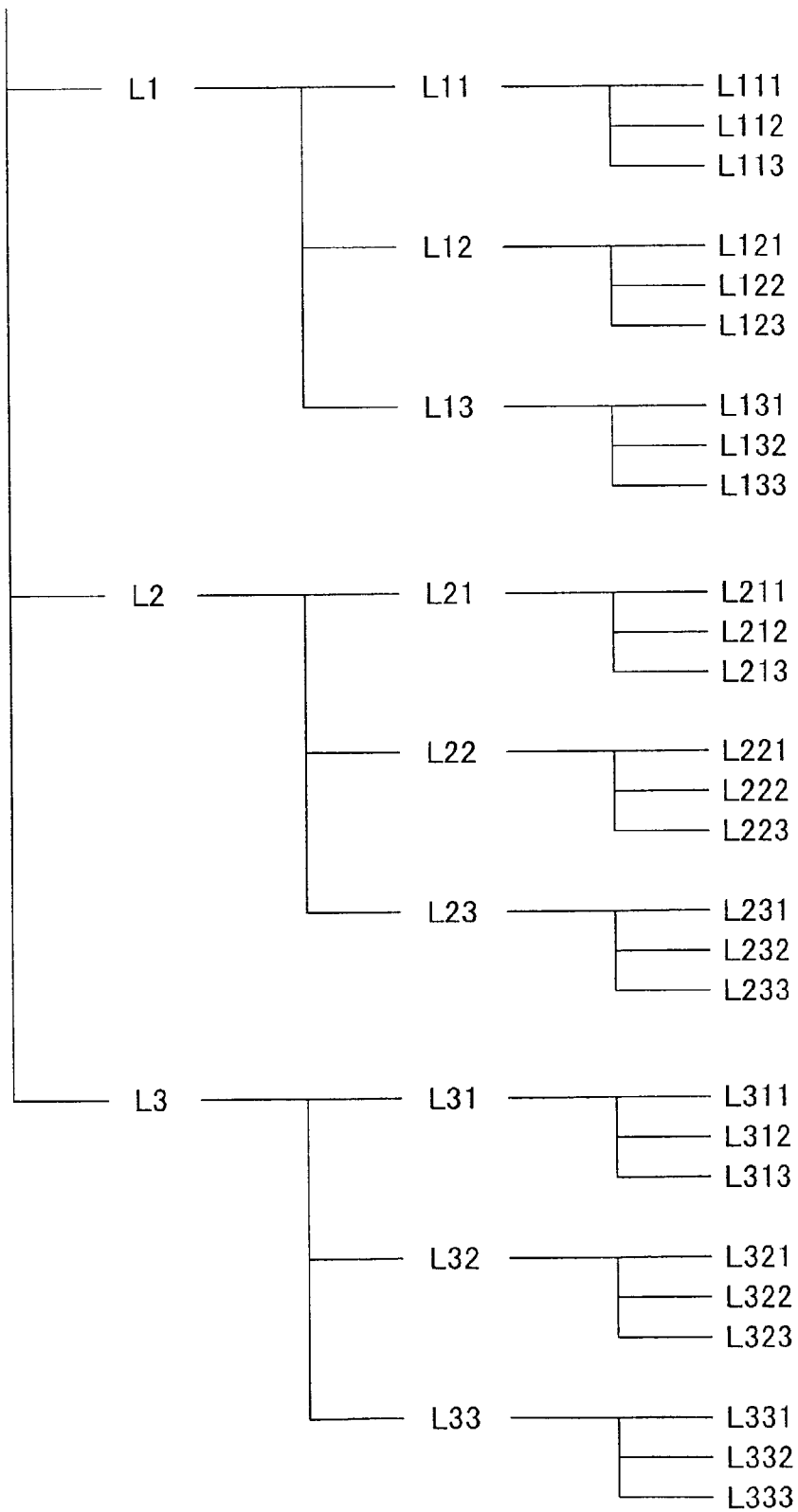
FIG. 11 is a schematic diagram for explaining a classification hierarchy as an example of meta-information according to the second embodiment of the present invention.

The classification hierarchy is assumed to have N levels. The case where N=3 is shown in FIG. 11. Any item of contents is classified into one of classification categories $Li_1$: a classification category in the first level, where $i_1$=1, 2, . . . , M (M: a positive integer).

An item of contents that is classified into the first level classification category $Li_1$ is further classified into $Li_1i_2$: a classification category in the second level, where $i_2=i_2(i_1)=1, \ldots, Mi_1$ ($Mi_1$: a positive integer).

Likewise, an item of contents that is classified into the (k−1)-th level classification category $Li_1i_2i_3 \ldots i_{(k-1)}$ is further classified into $Li_1i_2i_3 \ldots i_k$: a classification category in the kth level, where $i_k=i_k(i_1,i_2, \ldots, i_{(k-1)})=1, \ldots, Mi_1i_2i_3 \ldots i_{(k-1)}$ ($Mi_1i_2i_3 \ldots i_{(k-1)}$: a positive integer)

This procedure continues up to k=N. All items of contents are necessarily classified into one of the classification categories of N-th level.

As shown in FIG. 4, the information about the classification category of N-th level $Li_1,i_2i_3 \ldots i_N$ is stored in the meta-information DB 21. FIG. 4 shows the case where N=2.

In the case of the classification hierarchy shown in FIG. 11, each branch of the classification category is assumed to have the same number of levels (three in this case) for ease of description. The number of levels, however, may be different from branch to branch. The number of classification categories may also vary from branch to branch and from level to level.

The step 4 of FIG. 8 in which a distance between contents is calculated will be described specifically based on the classification hierarchy shown in FIG. 11. The contents mapping system according to the second embodiment uses a 3×3 symmetric matrix of which diagonal elements are A1 ($A_1$<1), and non-diagonal elements are B1 ($B_1 \geq 1$) as a first level distance matrix as shown in FIG. 12A. The size of the symmetric matrix matches the number of the first level categories.

If two items of contents a distance between which is to be calculated are classified into the same category, the element $A_1$ ($A_1$<1) is used. Otherwise, the element $B_1$ ($B_1 \geq 1$) is used.

Because the second level of the classification hierarchy has three categories, a second level distance matrix becomes a 3×3 symmetrical matrix, as shown in FIG. 12B, for example, of which diagonal elements are $A_2$ ($A_2$<1) and non-diagonal elements are $B_2$ ($B_2 \geq 1$), where $B_2$ satisfies $B_1 \geq B_2$.

That is, if two items of contents between which a distance is to be calculated are classified into the same category of the second level, the diagonal element $A_2$ ($A_2$<1) is used. Otherwise, the non-diagonal element $B_2$ ($B_2 \geq 1$) is used.

Since the third level of the classification hierarchy has three categories, a third level distance matrix becomes a 3×3 symmetrical matrix, as shown in FIG. 12C, for example, of which diagonal elements are A3 ($A_3$<1) and non-diagonal elements are $B_3$ ($B_3$<1), where $B_3$ satisfies $B_2 \geq B_3$.

That is, if two items of contents between which a distance is to be calculated are classified into the same category of the third level, the diagonal element $A_3$ ($A_3$<1) is used. Otherwise, the non-diagonal element $B_2$ ($B_2 \geq 1$) is used.

The contents mapping system according to the second embodiment adjusts the distance "$disth_{ij}$" between concept vectors $v_i$ and $v_j$ corresponding to contents $c_i$ and $c_j$, respectively, by multiplying by an adjustment coefficient $w_{ij}$ (see FIG. 13).

$$disth^*_{ij} = w_{ij} \times disth_{ij} \text{ (effective distance)}$$

The effective distance is a distance between the contents $c_i$ and $c_j$ in which the meta-information of the contents $c_i$ and $c_j$ are taken into consideration.

When the classification categories of the contents $c_i$ and $c_j$ match down to the second level in the classification hierarchy, the adjustment coefficient $w_{ij}$ is determined by checking whether the classification categories of the contents $c_i$ and $c_j$ match in the third level as follows:

$$w_{ij} = A_1 \times A_2 \times A_3 \text{ (match)}$$

$$w_{ij} = A_1 \times A_2 \times A_3 \text{ (not match)}.$$

If the classification categories of the contents $c_i$ and $c_j$ match in the first level but do not match in the second level, $$w_{ij} = A_1 \times B_2.$$

If the classification categories of the contents $c_i$ and $c_j$ do not match in the first level, $$w_{ij}=B_1.$$

Since the adjustment coefficient $w_{ij}$ is calculated as described above, the deeper the level at which the classification categories of contents match, the shorter the effective distance "$disth^*_{ij}$" ($=w_{ij} \times disth_{ij}$) becomes.

Figure 14A:
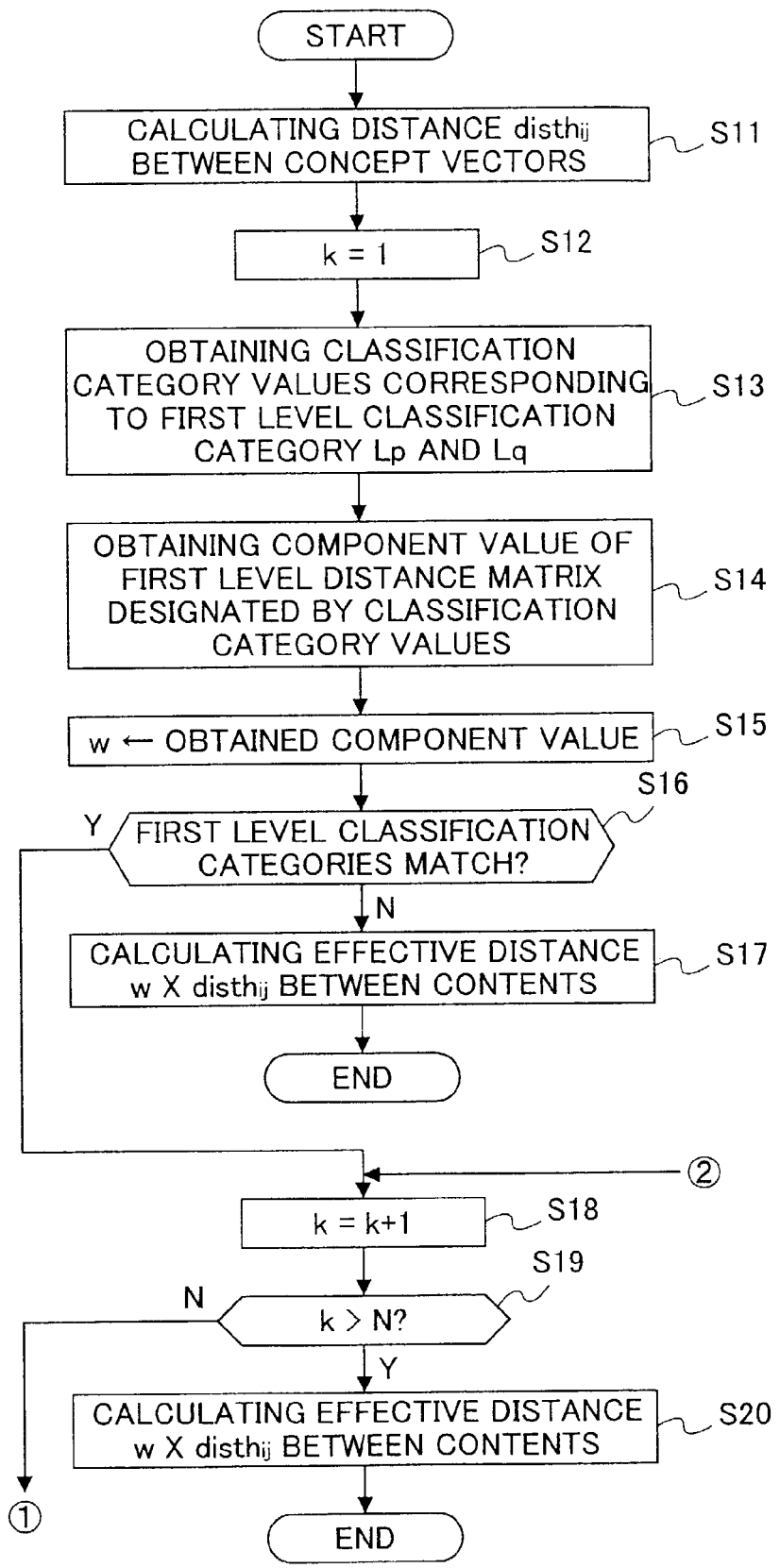
FIGS. 14A and 14B show a flow diagram of the calculation of an adjustment coefficient used in the method of mapping contents according to the second embodiment of the present invention.
Figure 14B:
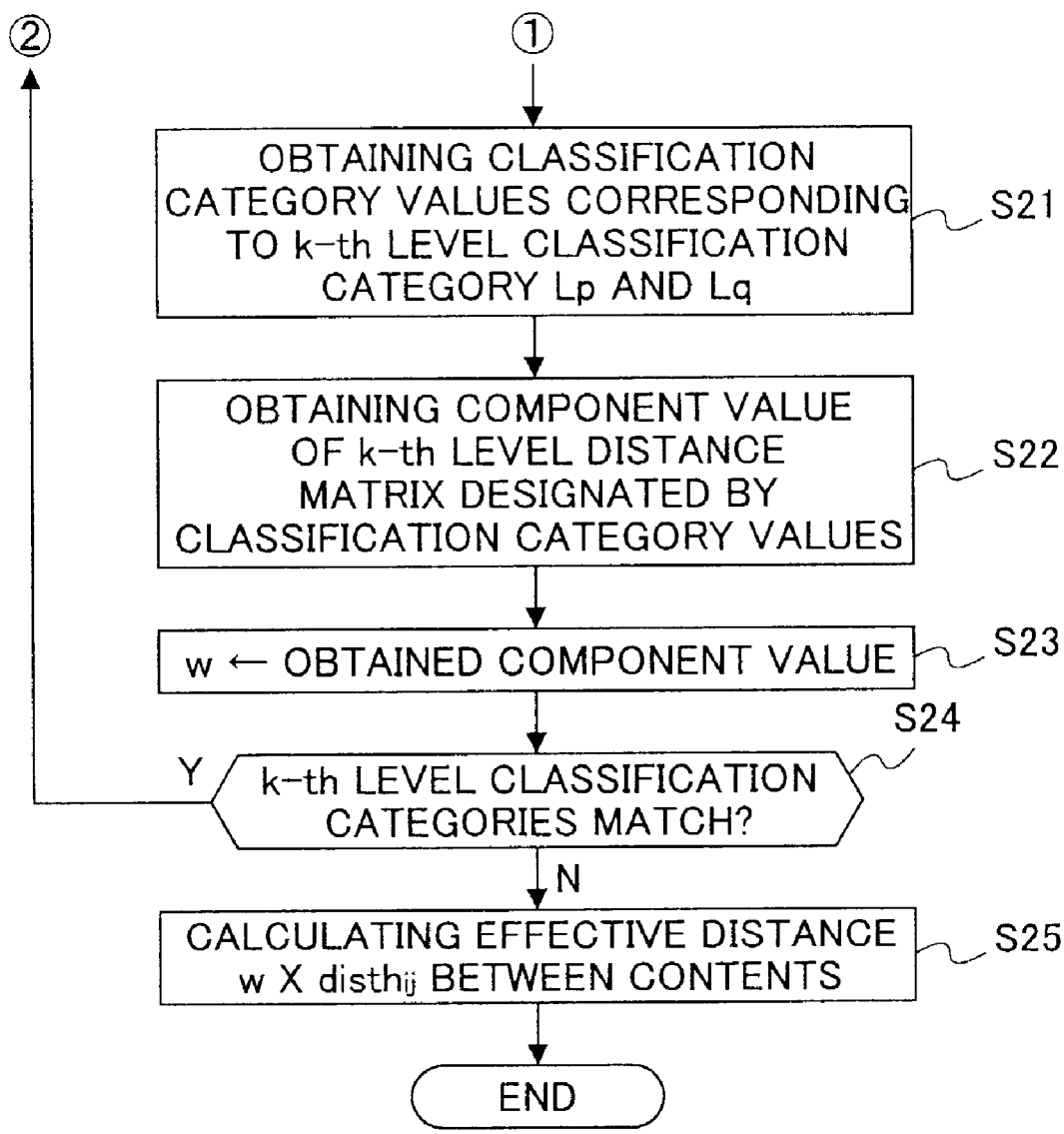

FIGS. 14A and 14B show a flow diagram describing step S4 of the flow diagram of FIG. 8 in detail, in which the effective distance between contents is calculated according to the second embodiment.

Before performing the steps of the flow diagram showed in FIGS. 14A and 14B, the contents mapping system 10 according to the second embodiment constructs, in the memory, distance matrices that are determined based on distances between two classification categories.

The distance matrix D[NULL] corresponding to a classification category $Li_1$ ($i_1=1, 2, \ldots, M$) in the first level of the classification hierarchy is defined as follows:

$$D[NULL]=S[NULL].$$

S[NULL] is a M×M non-negative symmetric matrix of which diagonal elements are "A" (A<1) and non-diagonal elements are "B" (B≧1).

For each classification category $Li_1$ of the first level, a distance matrix $D[Li_1]$ related to classification categories $Li_1 i_2$ ($i_2=i_2(i_1)=1, 2, \ldots, Mi_1$) is defined as follows:

$$D[Li_1]=D[NULL](i_1,i_1) \times S[Li_1].$$

$S[Li1]$ is an $Mi_1 \times Mi_1$ non-negative symmetric matrix of which diagonal elements are "$Ai_1$" ($Ai_1<1$) and non-diagonal elements are "$Bi_1$" ($Bi_1 \geq 1$). $Bi_1$ is determined so that $Bi_1 \leq B$. D[NULL] ($i_1,i_1$) is a ($i_1,i_1$) element of the distance matrix D[NULL].

Likewise, for each classification category $Li_1 \ldots i_k$ of the k-th level ($2 \leq k \leq N-1$), a distance matrix $D[Li_1 \ldots i_k]$ related to classification categories $Li_1 \ldots i_k i_{(k+1)}$ ($i_{(k+1)}=i_{(k+1)}$ ($i_1, \ldots, i_k$)=1, \ldots, $Mi_1 \ldots i_k$) in the (k+1)-th level is defined as follows:

$$D[Li_1 \ldots i_k]=D[Li_1 \ldots i_{(k-1)}](i_k,i_k) \times S[Li_1 \ldots i_k].$$

$S[Li_1 \ldots i_k]$ is an $Mi_1 \ldots i_k \times Mi_1 \ldots i_k$ non-negative symmetric matrix of which diagonal elements are "$Ai_1 \ldots i_k$" ($Ai_1 \ldots i_k<1$) and non-diagonal elements are "$Bi_1 \ldots i_k$" ($Bi_1 \ldots i_k \geq 1$). $Bi_1 \ldots i_k$ is determined so that $Bi_1 \ldots i_k \leq Bi_1 \ldots i_{(k-1)}$. $D[Li_1 \ldots i_{(k-1)}]$ ($i_k,i_k$) is a ($i_k,i_k$) element of the distance matrix $D[Li_1 \ldots i_{(k-1)}]$.

Next, the effective distance "$disth^*_{ij}$" between each combination of two items of contents $c_i$ and $c_j$ is calculated using the above distance matrices as follows:

$$disth^*_{ij}=w_{ij} \times disth_{ij}.$$

"$disth_{ij}$" is the Euclidian distance of concept vectors corresponding to $c_i$ and $c_j$. In the case where the classification category of $c_i$ is $Li_1 \ldots i_N$, and the classification category of $c_j$ is $Lj_1 \ldots j_N$, "$w_{ij}$" is determined as follows:

$$w_{ij}=D[NULL] (i_1,j_1) \text{ if } i_1 \neq j_1, \text{ and}$$

$$w_{ij}=D[Li_1 \ldots i_{(k-1)}] (i_k,j_k) \text{ otherwise}.$$

"k" indicates the level in the classification hierarchy down to which the two classification categories $Li_1 \ldots i_N$ and $Lj_1 \ldots j_N$ match. If $Li_1 \ldots i_N$ and $Lj_1 \ldots j_N$ are the same, then k=N. If $Li_1 \ldots i_N$ and $Lj_1 \ldots j_N$ differ from each other, "k" is an integer that satisfies the following:

$$i_1=j_1, \ldots, i_{(k-1)}=j_{(k-1)}, i_k \neq j_k.$$

In other words, "k" ($2 \leq k \leq N$) is the first integer at which $i_k \neq j_k$.

The effective distance "$disth^*_{ij}$" in which the distance between classification categories is taken into consideration is calculated for each combination of items of contents.

Referring to FIGS. 14A and 14B, step 4 of the flow diagram shown in FIG. 8 in which an effective distance is calculated for each combination of contents will be described specifically.

The contents mapping system according to the second embodiment calculates the Euclidian distance "$disth_{ij}$" between a concept vector $v_i$ of a content item $c_i$ and a concept vector $v_j$ of a content item $c_j$ (step S11). A variable k indicating a level in the classification hierarchy is set at "1" corresponding to the "first" level (step S12).

The contents mapping system 10 identifies the first level classification category value of the item of contents $c_i$ and the first level classification category value of the item of contents $c_j$ (step S13).

The contents mapping system 10 checks which element of the distance matrix corresponding to the first level of classification hierarchy is to be used (step S14). That is, the contents mapping system 10 refers to the distance matrix shown in FIG. 12A, for example, and determines which element, either $A_1$ or $B_1$, is to be used.

The identified element of the distance matrix is assigned to a variable w (step S15). The contents mapping system 10 determines whether the two classification categories identified in step S13 match (step S16). If the contents mapping system 10 determines that the classification categories do not match, the contents mapping system 10 calculates the effective distance "$disth^*_{ij}$" of the contents $c_i$ and $c_j$ by multiplying the value stored in the variable w and the Euclidian distance "$disth_{ij}$" (step S17). Then, this process ends.

On the other hand, if the contents mapping system 10 determines that the two classification categories identified in step S13 match (step S16), the variable k is increased by "1" (step S18), and it is determined whether the value stored in the variable k has exceeded "N", the number of levels that the classification hierarchy has (step S19).

If the contents mapping system 10 determines that the value of variable k has not exceeded "N", the contents mapping system 10 identifies the k-th level classification category value of the item of contents $c_i$ and the k-th level classification category value of the item of contents $c_j$ (step 21).

The contents mapping system 10 checks which element of the distance matrix corresponding to the k-th level of classification hierarchy is to be used (step S22). That is, in the case where k=2, the contents mapping system 10 refers to the distance matrix shown in FIG. 12B, for example, and determines which element, whether $A_2$ or $B_2$, is to be used.

The identified element of the distance matrix is multiplied with the variable w, and the result of the multiplication is assigned to the variable w (step S23). The contents mapping system 10 determines whether the classification categories identified in step S21 match (step S24). If the contents mapping system 10 determines that the classification categories do not match, the contents mapping system 10 calculates the effective distance "$disth^*_{ij}$" of the contents $c_i$ and $c_j$ by multiplying the value stored in the variable w and the Euclidian distance "$disth_{ij}$" (step S25). Then, this process ends.

On the other hand, if the contents mapping system 10 determines that the two classification categories identified in step S22 match (step S24), the contents mapping system 10 returns to step S18 to check the classification category values in the next lower level.

The contents mapping system 10 repeats steps 18 through 24 until it determines that the value of the variable k is greater than "N", the number of levels in the classification hierarchy in step S19. If the value of the variable k becomes greater than "N", the contents mapping system 10 calculates the effective distance "disth*$_{ij}$" of the contents $c_i$ and $c_j$ by multiplying the value of the variable w and the Euclidian distance "disth$_{ij}$" of the concept vectors of the contents $c_i$ and $c_j$ (step S20). Then, the contents mapping system 10 completes the process.

When the classification categories of the two items of contents $c_i$ and $c_j$ match in both the first level and the second level of the classification hierarchy, the contents mapping system 10 calculates the adjustment coefficient $w_{ij}$ based on whether the classification categories match in the third level of the classification hierarchy as shown in FIG. 13, for example:

$w_{ij}=A_1 \times A_2 \times A_3$ (match)

$w_{ij}=A_1 \times A_2 \times B_3$ (not match)

If the classification categories of the contents $c_i$ and $c_j$ match in the first level but do not match in the second level:

$w_{ij}=A_1 \times B_2$.

If the classification categories of the contents $c_i$ and $c_j$ do not match in the first level, $w_{ij}=B_1$.

The contents mapping system 10 calculates the effective distance of the contents $c_i$ and $c_j$ by multiplying the adjustment coefficient $w_{ij}$ to the Euclidian distance "disth$_{ij}$" of the concept vectors.

Since the adjustment coefficient $w_{ij}$ is calculated in the manner described above, the Euclidian distance "disth$_{ij}$" of the concept vectors is adjusted so that the more nearly the classification categories of the contents match, the shorter the effective distance "$w_{ij} \times$disth$_{ij}$" becomes.

The second embodiment is described above. The present invention is not limited to this embodiment. In the second embodiment, the effective distance "disth*$_{ij}$" is calculated by multiplying the adjustment coefficient $w_{ij}$ to the Euclidian distance "disth$_{ij}$". It is possible, however, to determine an adjustment value using the adjustment coefficient and obtain the effective distance "disth*$_{ij}$" by adding (or subtracting) the adjustment value to (or from) the Euclidian distance "disth$_{ij}$".

For example, once an adjustment coefficient is calculated in the manner described above, one can multiply the adjustment coefficient by a predetermined adjustment value so as to determine the actual adjustment value. The Euclidian distance of the concept vectors can be adjusted by adding the actual adjustment value. In this case, the more nearly the classification categories match, the shorter the effective distance becomes.

One can make the diagonal elements A1 of a distance matrix greater than "1" and the non-diagonal elements Bi of the distance matrix smaller than "1". If the adjustment coefficient is calculated in the same manner as described above, one can obtain another adjustment value that is to be subtracted from the Euclidian distance of the concept vectors. The more nearly the classification categories of the contents match, the shorter the effective distance becomes.

In the second embodiment, the distance matrix corresponding to the second level under the classification category value L1, for example, is assumed to be the same as the distance matrix corresponding to the second level under the classification category value L2. In a variation of the second embodiment, it is possible to make the elements of the distance matrix corresponding to the second level under the classification category value L1 vary from the elements of the distance matrix corresponding to the second level under the classification category value L2, for example.

Third Embodiment

The contents mapping system 10 according to the first embodiment and the contents mapping system 10 according to the second embodiment adjust the distance of concept vectors, and then, map the contents to a two dimensional plane using multi-dimensional scaling. On the other hand, it is possible to map the concept vectors in a two dimensional plane without adjusting the distance of concept vectors, and then, move the position information in a two dimensional plane so that the contents map reflects classification categories. Detailed description follows.

Figure 15:
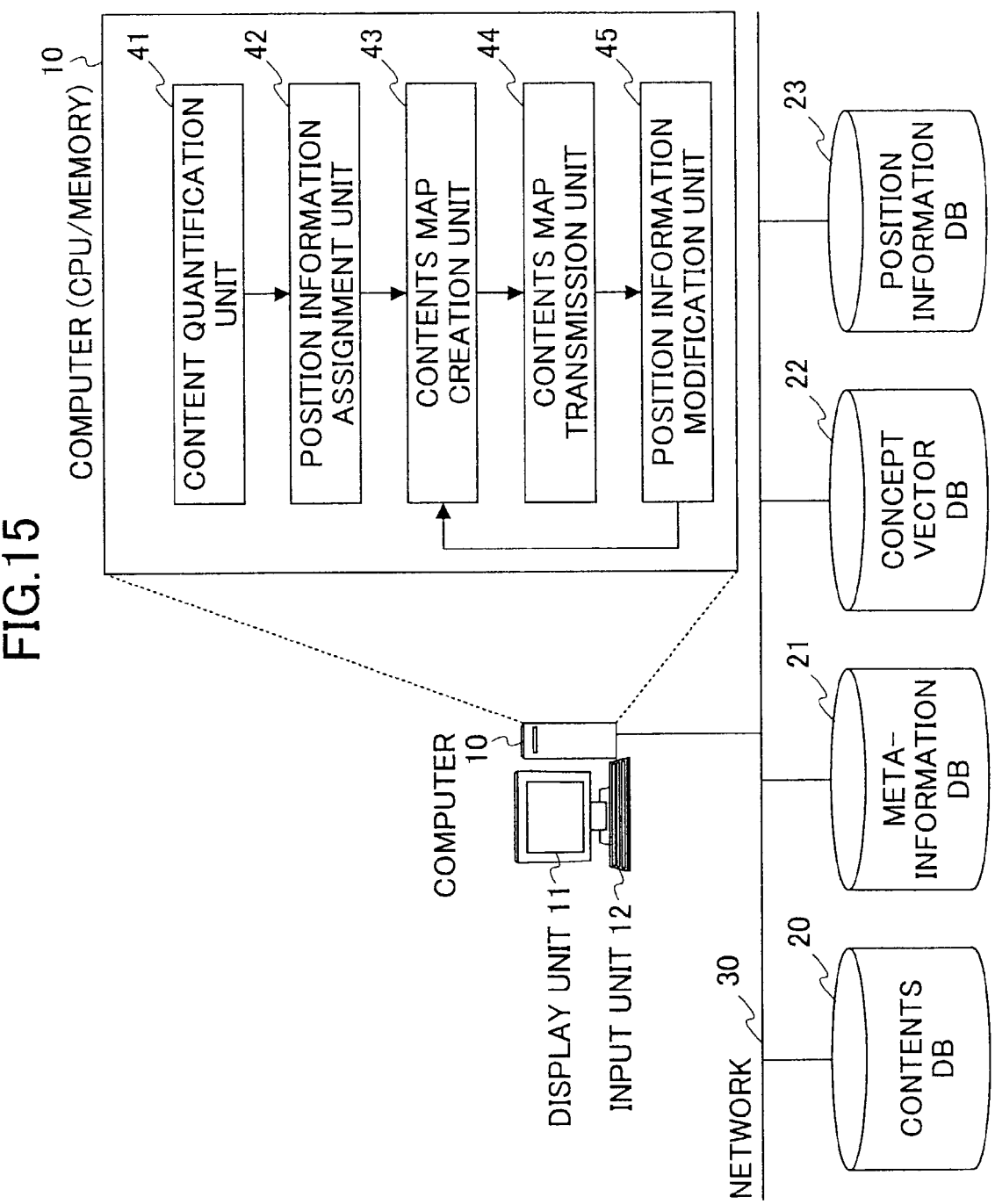
FIG. 15 is a schematic diagram showing a computer system that performs the method of mapping contents according to the third embodiment of the present invention.

FIG. 15 is a schematic diagram showing a contents mapping system according to a third embodiment of the present invention. The contents mapping system according to the third embodiment is different from the contents mapping system according to the first embodiment and the contents mapping system according to the second embodiment in that the contents mapping system according to the third embodiment additionally has a position information modification unit 45.

In the case where a user finds the position information of the contents shown in the map of contents transmitted by the contents map transmission unit 44 is not clustered enough to reflect the classification categories in a level of the classification hierarchy, the user can modify the position information by activating the position information modification unit 45.

Figure 16:
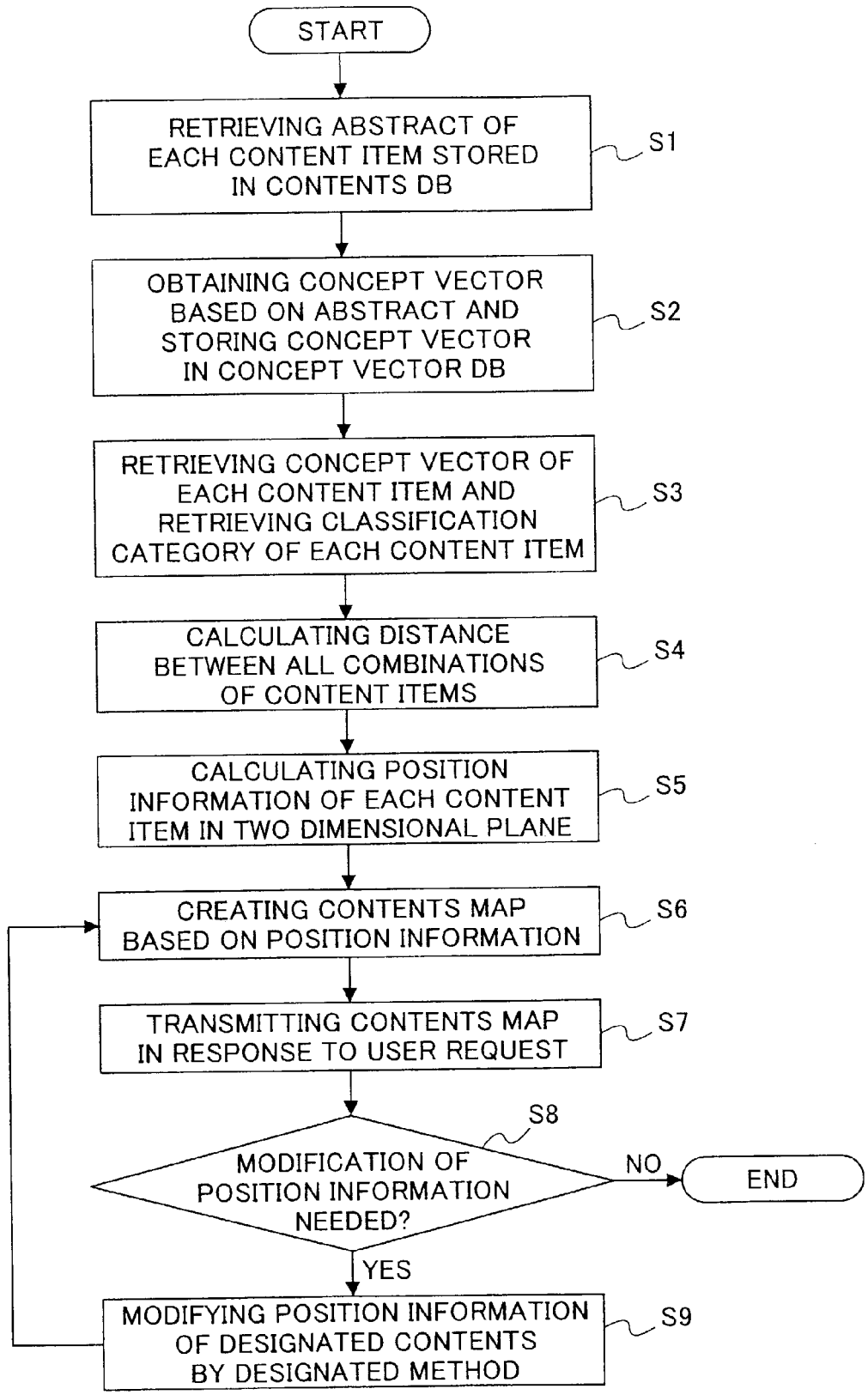
FIG. 16 is a flow diagram showing the method of mapping contents according to the third embodiment of the present invention.

FIG. 16 is a flow diagram showing the operation of the contents mapping system according to the third embodiment shown in FIG. 15. Referring to this flow diagram, each step of the operation will be described below.

The concept quantification unit 41 retrieves a brief description of each item of contents stored in the contents DB 20 to the memory unit, and generates a concept vector based on the brief description (step S1). A concept vector is a high dimensional real-valued vector. The generated concept vector is stored in the concept vector DB 22 corresponding to each item of contents (step S2).

The position information assignment unit 42 retrieves concept vectors stored in the concept vector DB 22 and stores the retrieved concept vectors in the memory unit. The position information assignment unit 42 also retrieves meta-information stored in the meta-information DB 21 and stores the retrieved meta-information in the memory (step S3). The position information assignment unit 42 calculates distances between all combinations of items of contents that are to be displayed in the contents map (step S4).

Items of contents that are not displayed in the contents map may not be included in the calculation of distance. If items to be displayed in the contents map are selected, for example, based on a search condition, only the selected items are used in the calculation of distance.

In this embodiment, the contents mapping system proceeds to step 5 without adjusting the Euclidian distance "disth$_{ij}$" of the contents $c_i$ and $c_j$, which is regarded as an effective distance "disth*$_{ij}$".

Then, the position information assignment unit 42 calculates position information of each item of contents in a two dimensional plane by multi-dimensional scaling (step S5).

As shown in FIG. 7, the resulting position information $(x_i, y_i)$ (i=1, 2, . . . , n) is stored in the position information DB 23.

The position information of contents thus calculated does not reflect the meta-information such as the classification hierarchy. The contents are mapped based on the distance obtained based on only the distance of concept vectors.

The contents map creation unit 43 retrieves the position information of each item of contents in a two dimensional plane stored in the position information DB 23 into the memory. Then, based on the retrieved position information, the contents map creation unit 43 creates a map of contents (step S6). The contents map transmission unit 44 transmits the created map of contents to the user computer (step S7).

Watching the map of contents displayed on the user computer, the user checks whether the map of contents is well clustered in accordance with the classification category (step S8). If the user determines that the map of contents is well clustered, the user can finish the process (No branch of step S8).

Figure 21:
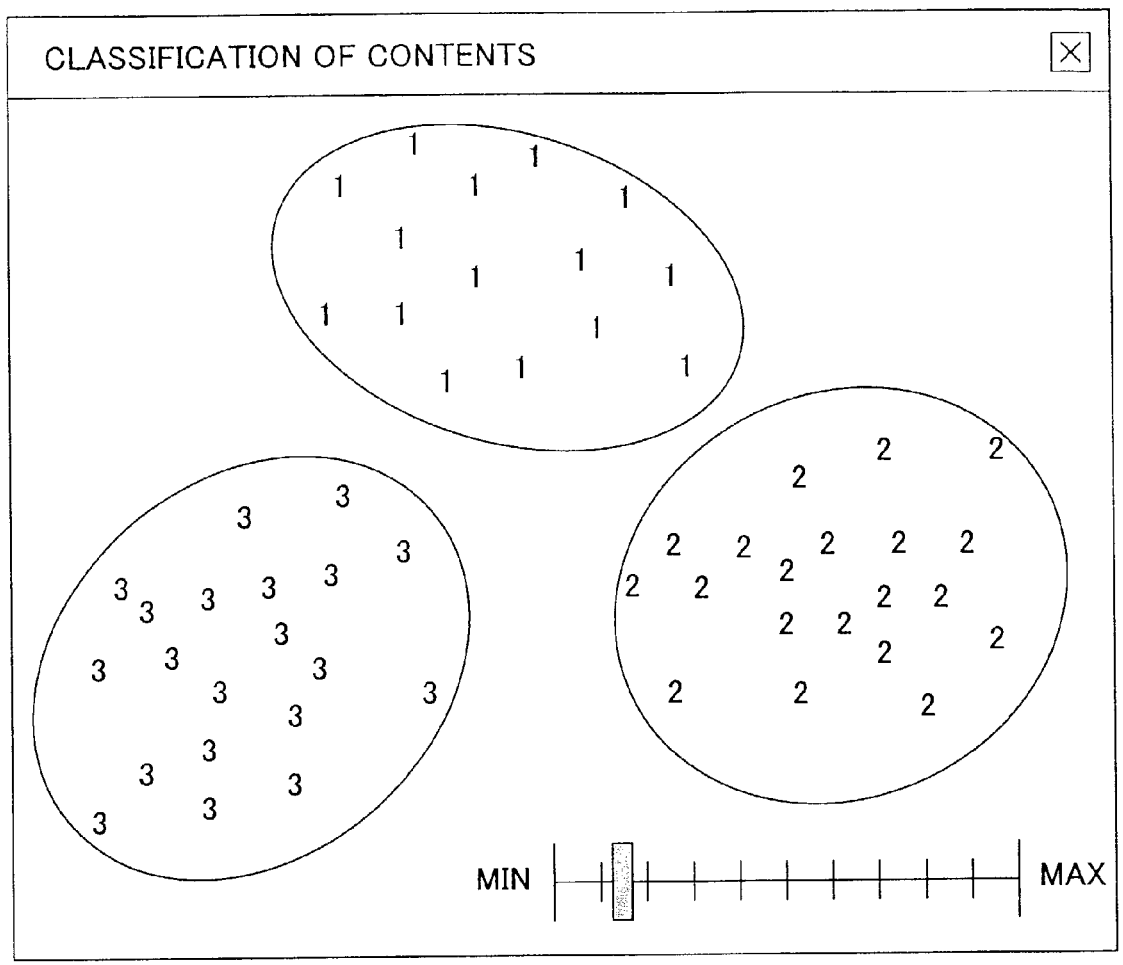
Figure 23:
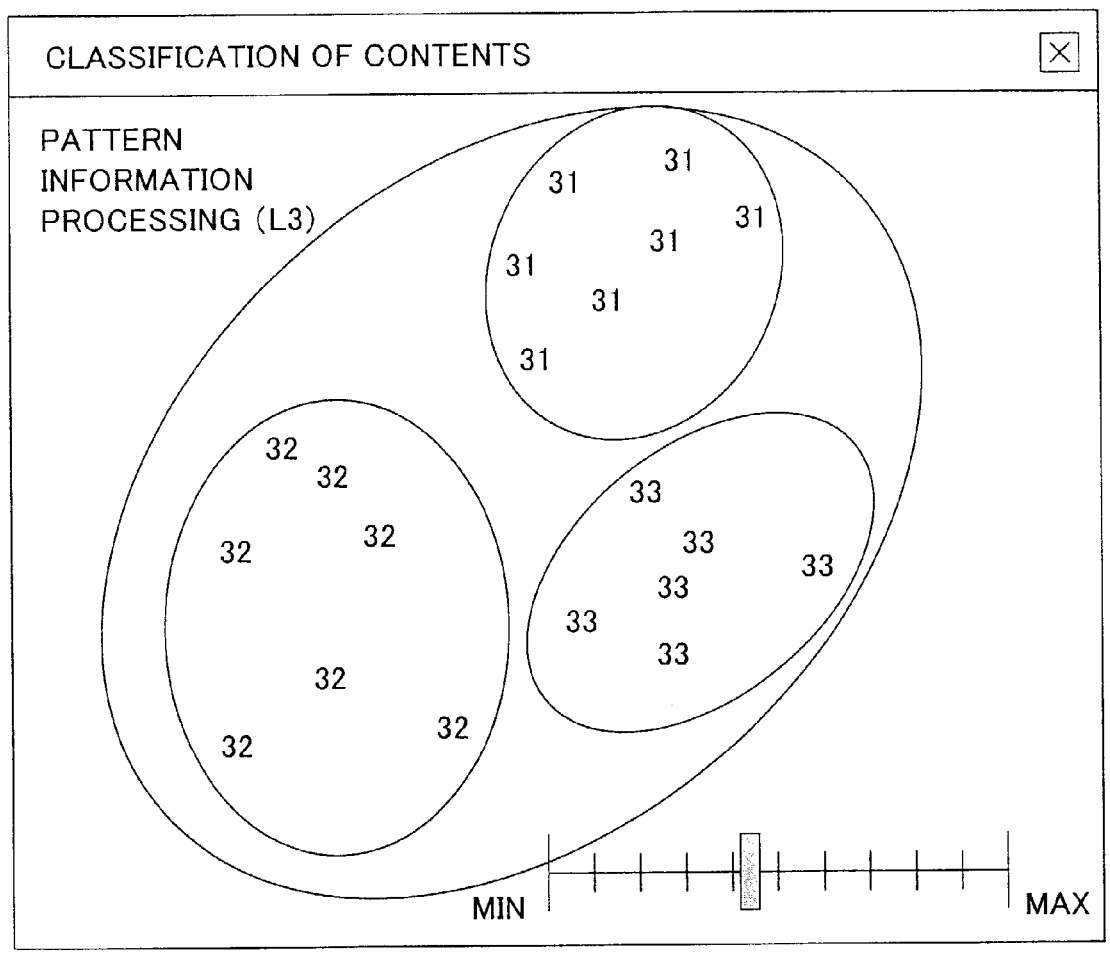

The word "well clustered" means that items of contents classified in the same classification category are distributed closely, and items of contents classified in different classification are distributed remotely as shown in FIGS. 21 and 23.

On the other hand, if the user finds that items of contents in a certain classification category are not well clustered in the map of contents shown on the user computer, the contents mapping system proceeds to step S9 in response to a user's request (Yes branch of step S8).

Figure 17:
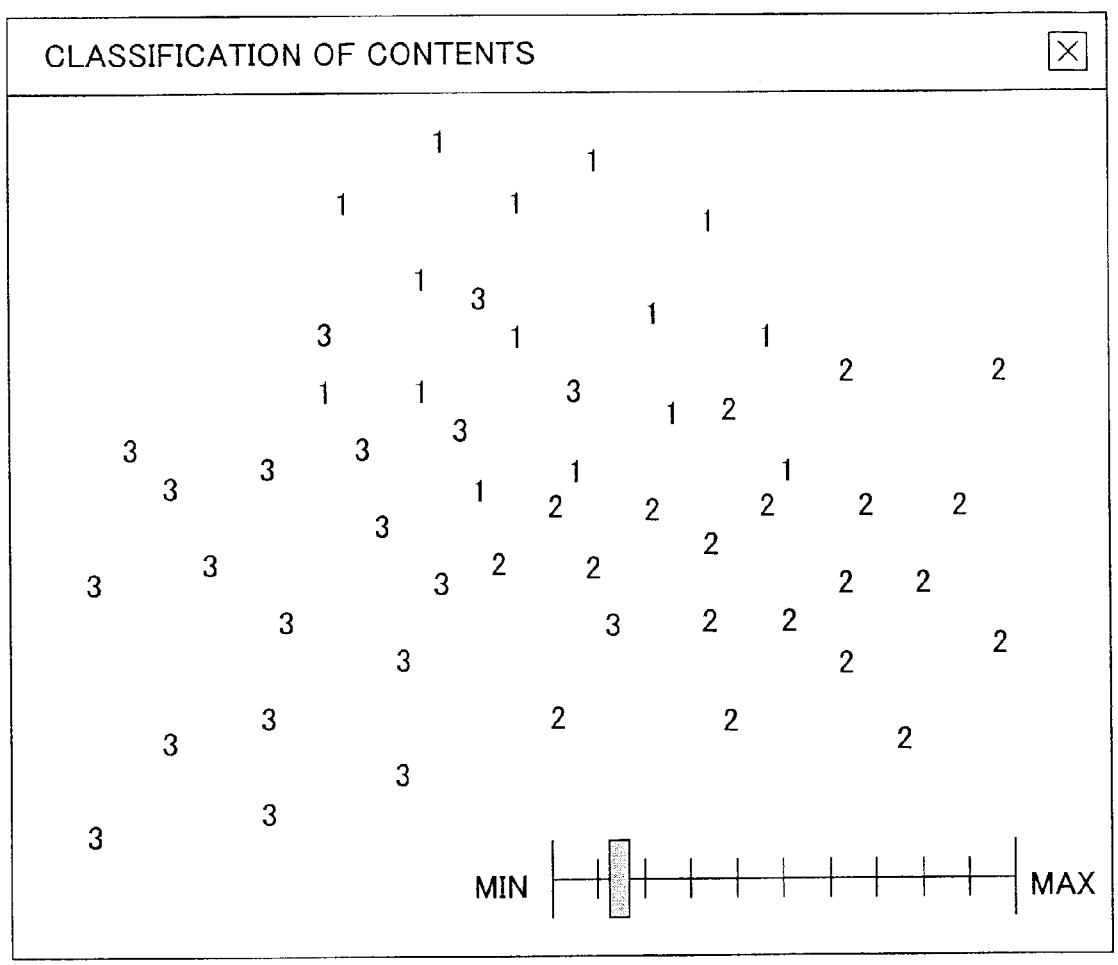
FIGS. 17-21 are scatter diagrams of the first hierarchy according to the third embodiment of the present invention.

FIG. 17 shows an example of map of contents in which the boundaries of the first level are not clear. Contents classified into three classification categories, artificial intelligence (L1), computational linguistics (L2), and pattern information processing (L3), are not well clustered. In the map of contents of FIG. 17, numerals "1", "2", and "3" stand for the contents classified into the classification category L1, L2, and L3, respectively.

The contents mapping system according to the third embodiment can modify, in response to a user's request, the position information of contents so that the contents become well clustered.

Figure 18:
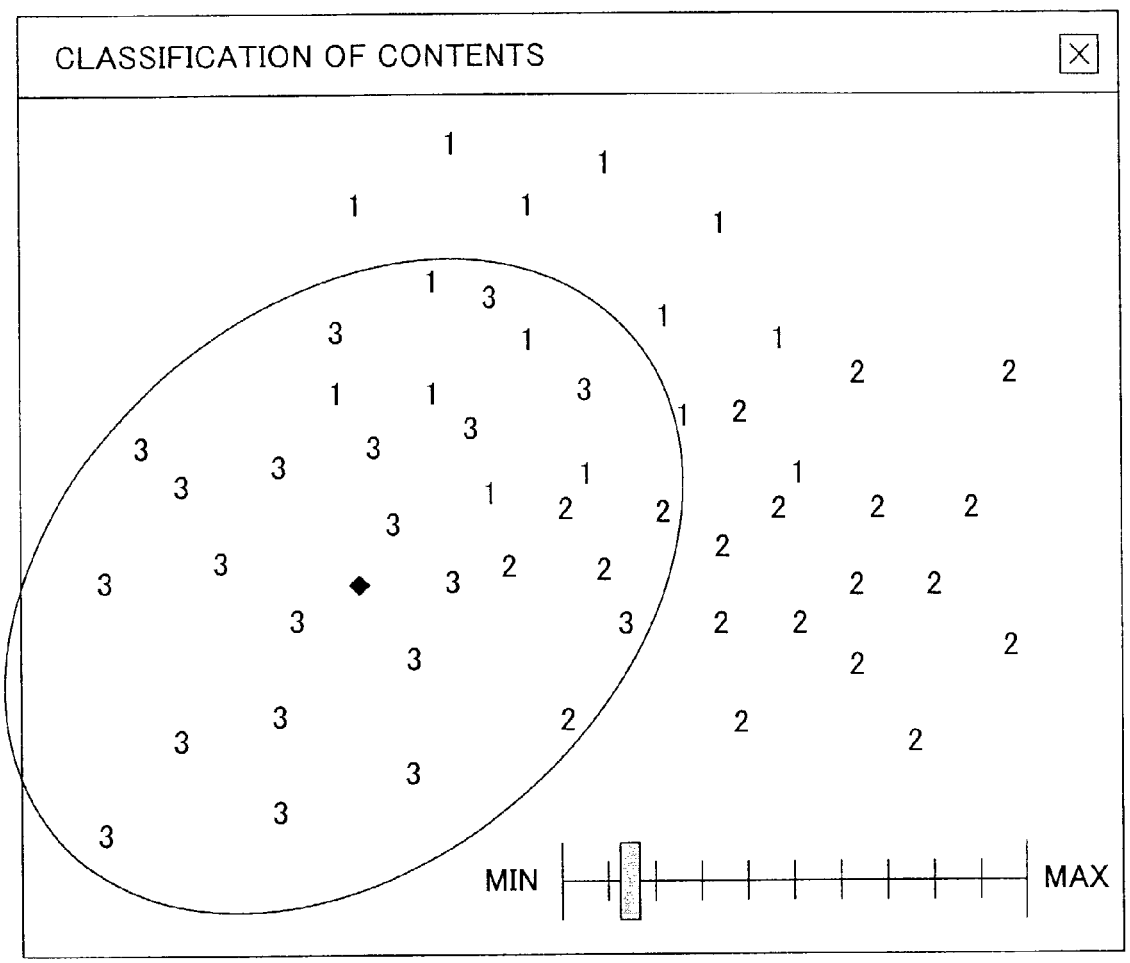

As a user watches a map of contents in which the contents are not well clustered, the user designates a classification category that the user desires to modify. FIG. 18 shows the case where the user has designated the classification category L3.

In response to the user's designation, the contents mapping system according to the third embodiment draws an oval surrounding the contents classified into the designated classification category L3 on the map of contents. The contents mapping system calculates the barycentric position of the contents classified into the designated classification category, and marks the barycenter as "♦" in the map of contents. The contents mapping system reduces the distance between the barycenter and each item of contents at a constant proportion so that the designated contents approach the barycenter.

The constant proportion may be input by the user through a user computer.

Figure 19:
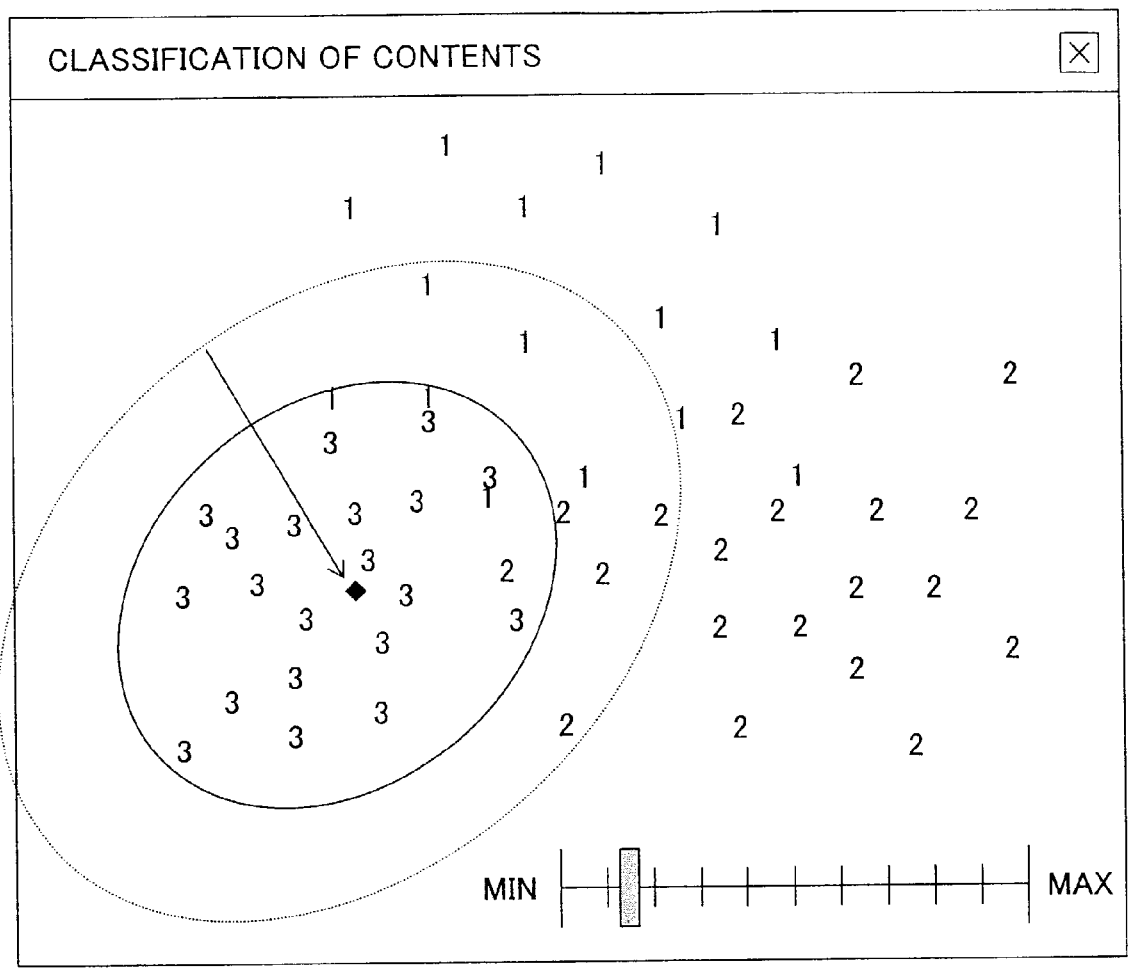

FIG. 19 shows a map of contents after such a modification. An oval drawn by a dotted line indicates the range in which the contents are distributed before the modification. The oval does not appear on the map of contents displayed on the user computer.

Figure 20:
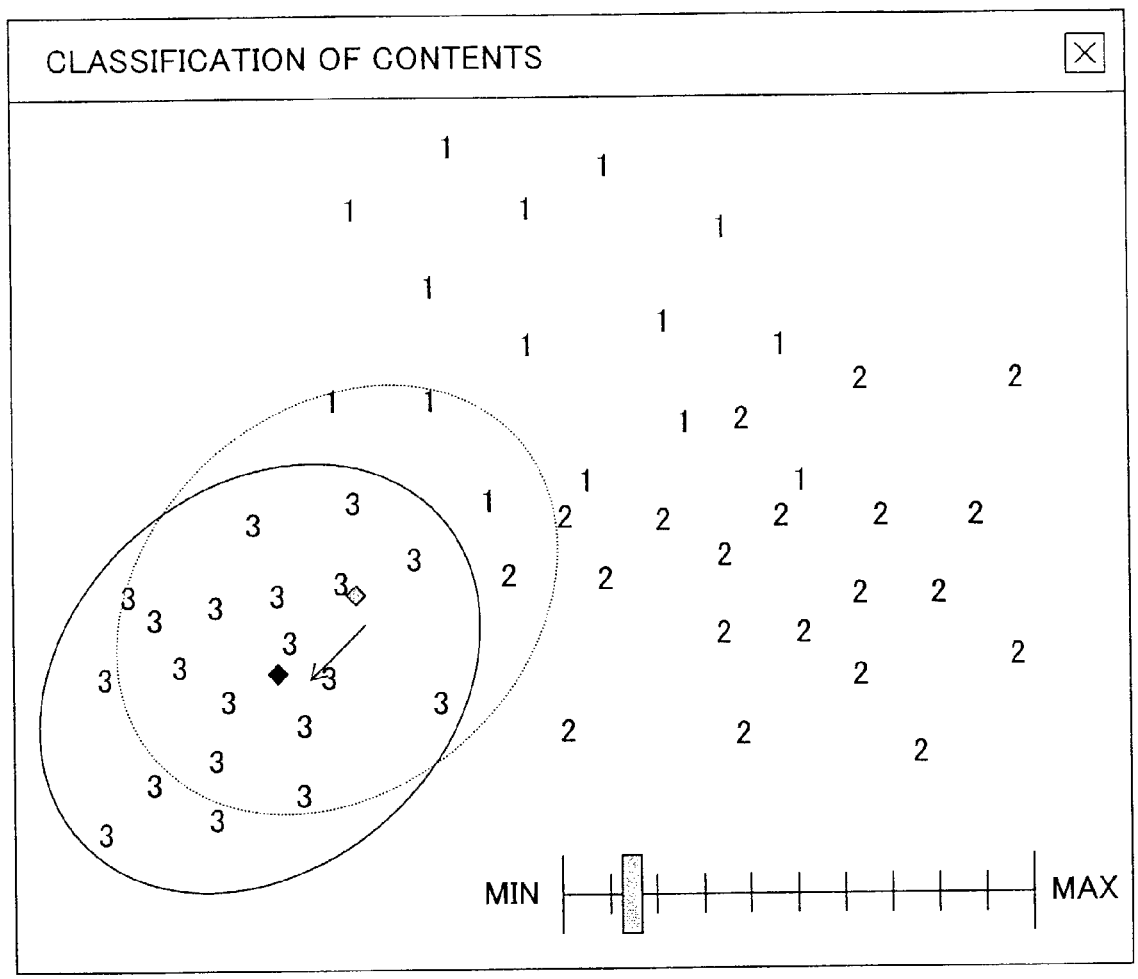

In the case of the map of contents shown in FIG. 19, some items of contents of the classification categories L1 and L2 are still located in the oval indicating the cluster of the classification category L3. The contents are not yet well clustered in the map of contents. In this case, the contents mapping system according to the third embodiment can further modify the map of contents. The contents mapping system can move the contents of the designated classification category in a direction for a distance (step S9). The direction and the distance can be input by the user. FIG. 20 shows how the contents are moved. FIG. 20 shows that the barycenter of the contents of the designated classification category L3 is moved as indicated by an arrow. An oval drawn by a dotted line indicates the range of the contents before the modification. The contents mapping system according to the third embodiment can modify the map of contents so that the contents classified into the first level classification category L1, L2, and L3 are well clustered as shown in FIG. 21 by repeating steps S6 through S9.

Figure 22:
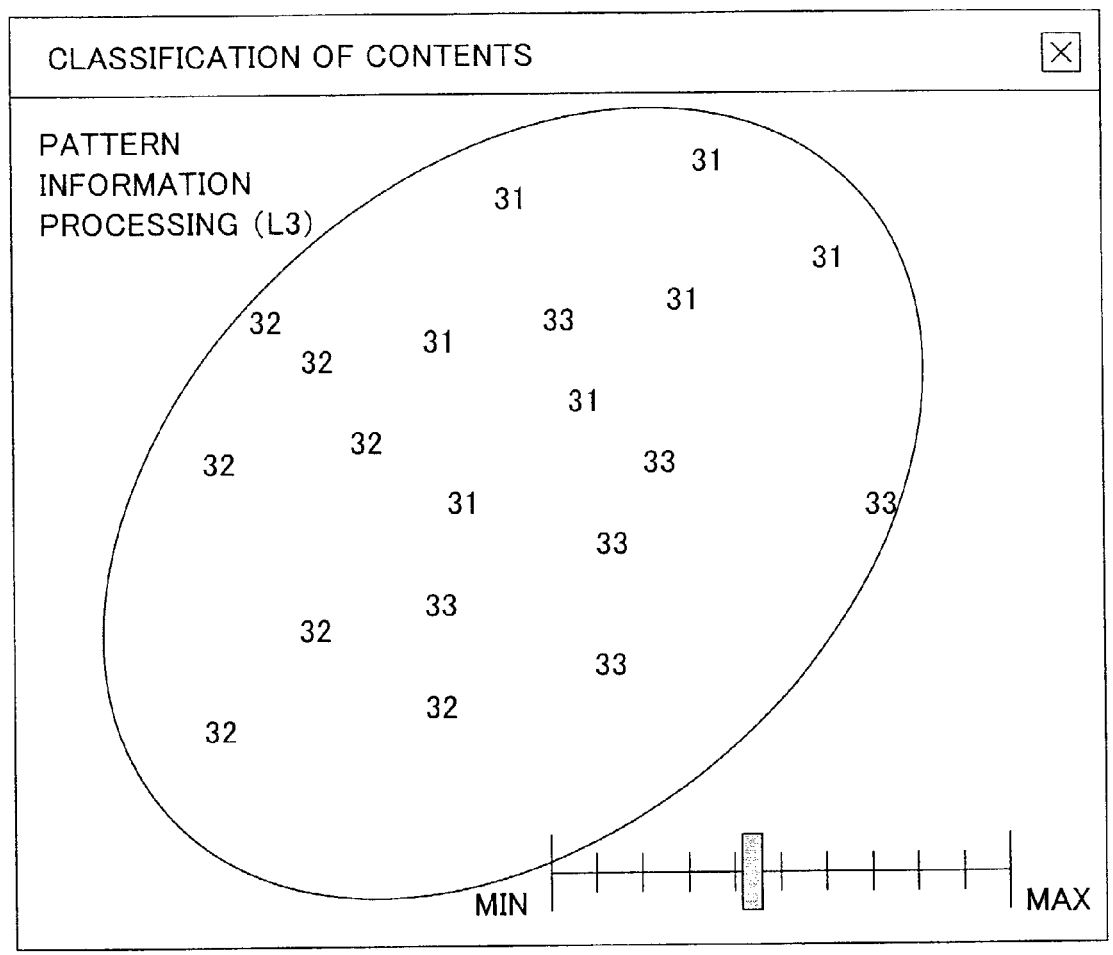
FIGS. 22 and 23 are scatter diagrams of the second hierarchy according to the third embodiment of the present invention.

The user can select the classification category L3 in the first level thus clustered by, for example, clicking the area in the oval. In response to the user's selection, the map of contents of the second level is displayed as shown in FIG. 22. In this case, the user has selected the classification category L3 for example.

As shown in FIG. 22, the contents classified into the classification category L3, which includes the classification categories L31, L32, and L33, are not clustered well. The user can further perform the same steps described above in connection with the first level of the classification hierarchy so that the contents classified into the classification category L3 are well clustered.

As shown in FIG. 23, the contents mapping system can modify, in response to a user's request, the map of contents so that the contents thus clustered in the first level as described above are well clustered into three classification categories L31, L32, and L33 in the second level. The contents mapping system can further modify the map of contents in the same manner so that the contents of the other classification categories such as L11, L12, and L13 are well clustered.

In FIGS. 22 and 23, numerals "31", "32", and "33" stand for the contents classified into the classification categories L31, L32, and L33, respectively.

The modification method described above can be first applied to any level of the classification hierarchy. Additionally, in the above example, the distance between the barycenter and each item of contents is reduced (first step), and then, the contents are moved in a direction (second step). In a variation of the third embodiment, the order of the first steps and the second steps may be switched. In another variation of the third embodiment, it is possible to perform either the first step or the second step.

As described above, in the first and second embodiments, the contents mapping system modifies the map of contents so that the contents are clustered before the contents are mapped into a low dimensional space such as a two dimensional plane. On the other hand, the contents mapping system according to the third embodiment clusters the contents after mapping the contents into a low dimensional space so that the classification information is reflected in the map of contents. In another embodiment, the contents mapping system can first cluster the contents to some extent based on the classification information before mapping the contents into a low dimensional space, and secondly cluster the contents fully after mapping the contents into a low dimensional space.

Meta-information, other than the classification information, that indicates classification may be reflected to the distance between concept vectors by processing the classification in the same manner where the classification information is processed.

The preferred embodiments of the present invention are described above. The present invention is not limited to these embodiments, but various variations and modifications may be made without departing from the scope of the present invention.

This patent application is based on Japanese priority patent applications No. 2001-352056 filed on Nov. 16, 2001 and No. 2002-055461 filed on Mar. 1, 2002, the entire contents of which are hereby incorporated by reference.

What is claimed is:

1. A method of mapping contents comprising:
providing each item of the contents with classification information comprising a plurality of hierarchical levels;
assigning each item of the contents a concept vector; and
mapping each item of the contents in a predetermined dimensional space based on the provided classification information and the assigned concept vector;
wherein the mapping comprises:
calculating a distance between two items of contents based on the concept vectors assigned thereto;
calculating an adjustment coefficient based on how nearly the classification information of said two items of contents match each other;
adjusting the calculated distance based on the classification information of said two items of contents by multiplying the calculated distance by the adjustment coefficient so that the calculated distance is reduced to such an extent that the closer said two items of the contents are to each other the more nearly the assigned classification information of said two items of contents match each other; and
assigning each item of contents the position information in the predetermined dimensional space based on the adjusted distance,
wherein said adjustment coefficient is calculated using a distance matrix of which size is determined by the number of the classification categories in the lowest level down to which classification categories of said two items of contents match.

2. The method as claimed in claim 1,
wherein
the classification information is a classification hierarchy in which each item of contents is assigned a classification category; and
said distance is reduced to such an extent that a number of levels at which the classification categories assigned to said two items of contents match.

3. A method of mapping contents comprising:
providing each item of the contents with classification information comprising a plurality of hierarchical levels;
assigning each item of the contents a concept vector; and
mapping each item of the contents in a predetermined dimensional space based on the provided classification information and the assigned concept vector;
wherein the mapping comprises:
calculating a distance between two items of contents based on the concept vectors assigned thereto;
calculating an adjustment coefficient based on how nearly the classification information of said two items of contents match each other;
mapping each item of contents in the predetermined dimensional space based on the distance; and
adjusting the mapping based on the classification information of said two items of contents by multiplying the calculated distance by the adjustment coefficient so that the distance between two items of the contents is reduced to such an extent that the closer said two items of the contents are to each other the more nearly the assigned classification information of said two items of contents match each other,
wherein said adjustment coefficient is calculated using a distance matrix of which size is determined by the number of the classification categories in the lowest level down to which classification categories of said two items of contents match.

4. The method as claimed in claim 3,
wherein
the classification information is a classification hierarchy in which each item of contents is assigned a classification category; and
said distance is adjusted so that the closer the classification information of said two items of contents match, the shorter the distance between the position information of said two items of contents becomes.

5. The method as claimed in claim 4, wherein a barycenter of contents classified into a classification category of a level is calculated in response to a user request; and
a distance between each item of contents and said barycenter is proportionally reduced.

6. A method of mapping contents comprising:
providing each item of the contents with classification information comprising a plurality of hierarchical levels;
assigning each item of the contents a concept vector; and
mapping each item of the contents in a predetermined dimensional space based on the provided classification information and the assigned concept vector;
wherein the mapping comprises:
calculating a distance between two items of contents based on the concept vectors assigned thereto;
calculating an adjustment coefficient based on how nearly the classification information of said two items of contents match each other;
adjusting the calculated distance based on the classification information of said two items of contents by multiplying the calculated distance by the adjustment coefficient so that the calculated distance is reduced to such an extent that the closer said two items of the contents are to each other the more closely the assigned classification information of said two items of contents match each other;
mapping each item of contents based on the adjusted distance; and
further adjusting the mapping based on the classification information of said two items of contents so that the distance between two items of the contents is reduced to such an extent that the two items of the contents are close to each other with respect to the assigned classification information,
wherein said adjustment coefficient is calculated using a distance matrix of which size is determined by the number of the classification categories in the lowest level down to which classification categories of said two items of contents match.

7. The method as claimed in claim 1, wherein said position information in the predetermined dimensional space is assigned to each item of contents by applying a multi-dimensional scaling method.

8. The method as claimed in claim 3, wherein said position information in the predetermined dimensional space is assigned to each item of contents by applying a multi-dimensional scaling method.

9. The method as claimed in claim 6, wherein said position information in the predetermined dimensional space is assigned to each item of contents by applying a multi-dimensional scaling method.

10. The method as claimed in claim 1, further comprising transmitting position information assigned to each item of contents by the mapping and a classification category of the item of contents to an exterior via a network.

11. The method as claimed in claim 3, further comprising transmitting said position information assigned to each item of contents and a classification category of the item of contents to an exterior via a network.

12. The method as claimed in claim 6, further comprising transmitting said position information assigned to each item of contents and a classification category of the item of contents to an exterior via a network.

13. The method as claimed in claim 10, wherein a range of items of contents of which said position information and said classification categories are transmitted is expanded or reduced in a continuous manner in response to a user request.

14. The method as claimed in claim 11, wherein a range of items of contents of which said position information and said classification categories are transmitted is expanded or reduced in a continuous manner in response to a user request.

15. The method as claimed in claim 12, wherein a range of items of contents of which said position information and said classification categories are transmitted is expanded or reduced in a continuous manner in response to a user request.

16. An apparatus for mapping contents comprising:
    means for providing each item of the contents with classification information comprising a plurality of hierarchical levels;
    means for assigning each item of the contents a concept vector; and
    means for mapping each item of the contents in a predetermined dimensional space based on the provided classification information and the assigned concept vector;
    wherein said means for mapping further comprises:
        means for calculating a distance between two items of contents based on the concept vectors assigned thereto;
        means for calculating an adjustment coefficient based on how nearly the classification information of said two items of contents match each other;
        means for adjusting the calculated distance based on the classification information of said two items of contents by multiplying the calculated distance by the adjustment coefficient so that the calculated distance is reduced to such an extent that the closer said two items of the contents are to each other the more nearly the assigned classification information of said two items of contents match each other; and
        means for assigning each item of contents the position information in the predetermined dimensional space based on the adjusted distance,
    wherein said adjustment coefficient is calculated using a distance matrix of which size is determined by the number of the classification categories in the lowest level down to which classification categories of said two items of contents match.

17. The apparatus as claimed in claim 16,
    wherein
    the classification information is a classification hierarchy in which each item of contents is assigned a classification category; and
    said distance is reduced to such an extent that a number of levels at which the classification categories assigned to said two items of contents match.

18. The apparatus as claimed in claim 17, wherein said distance between said two items of contents is adjusted by adding an adjustment value corresponding to the level down to which the classification categories of said two items of contents match.

19. The apparatus as claimed in claim 17, wherein said distance between said two items of contents is adjusted by multiplying an adjustment coefficient corresponding to the level down to which the classification categories of said two items of contents match.

20. An apparatus for mapping contents comprising:
    means for providing each item of the contents with classification information comprising a plurality of hierarchical levels;
    means for assigning each item of the contents a concept vector; and
    means for mapping each item of the contents in a predetermined dimensional space based on the provided classification information and the assigned concept vector;
    wherein said means for mapping comprises:
        means for calculating a distance between two items of contents based on the concept vectors assigned thereto;
        means for calculating an adjustment coefficient based on how nearly the classification information of said two items of contents match each other;
        means for mapping each item of contents in the predetermined dimensional space based on the distance; and
        adjusting the mapping based on the classification information of said two items of contents by multiplying the calculated distance by the adjustment coefficient so that the distance between two items of the contents is reduced to such an extent that the closer said two items of the contents are to each other the more nearly the assigned classification information of said two items of contents match each other,
    wherein said adjustment coefficient is calculated using a distance matrix of which size is determined by the number of the classification categories in the lowest level down to which classification categories of said two items of contents match.

21. The apparatus as claimed in claim 20,
    wherein
    the classification information is a classification hierarchy in which each item of contents is assigned a classification category; and
    said distance is adjusted so that the closer the classification information of said two items of contents match, the shorter the distance between the position information of said two items of contents becomes.

22. The apparatus as claimed in claim 21, wherein a barycenter of contents classified into a classification category of a level is calculated in response to a user request; and a distance between each item of contents and said barycenter is proportionally reduced.

23. An apparatus for mapping contents comprising:

means for providing each item of the contents with classification information comprising a plurality of hierarchical levels;

means for assigning each item of the contents a concept vector; and means for mapping each item of the contents in a predetermined dimensional space based on the provided classification information and the assigned concept vector;

wherein said means for mapping comprises:

means for calculating a distance between two items of contents based on the concept vectors assigned thereto;

means for calculating an adjustment coefficient based on how nearly the classification information of said two items of contents match each other;

means for adjusting the calculated distance based on the classification information of said two items of contents by multiplying the calculated distance by the adjustment coefficient so that said distance is reduced to such an extent that the closer said two items of the contents are to each other the more nearly the assigned classification information of said two items of contents match each other;

means for mapping each item of contents based on the adjusted distance; and means for further adjusting the mapping based on the classification information of said two items of contents so that the distance between two items of the contents is reduced to such an extent that the two items of the contents are close to each other with respect to the assigned classification information, wherein said adjustment coefficient is calculated using a distance matrix of which size is determined by the number of the classification categories in the lowest level down to which classification categories of said two items of contents match.

24. The apparatus as claimed in claim 16, wherein said position information in the predetermined dimensional space is assigned to each item of contents by applying a multi-dimensional scaling method.

25. The apparatus as claimed in claim 20, wherein said position information in the predetermined dimensional space is assigned to each item of contents by applying a multi-dimensional scaling method.

26. The apparatus as claimed in claim 23, wherein said position information in the predetermined dimensional space is assigned to each item of contents by applying a multi-dimensional scaling method.

27. The apparatus as claimed in claim 16, further comprising means for transmitting position information assigned to each item of contents by the mapping and a classification category of the item of contents to an exterior via a network.

28. The apparatus as claimed in claim 20, further comprising means for transmitting said position information assigned to each item of contents and a classification category of the item of contents to an exterior via a network.

29. The apparatus as claimed in claim 23, further comprising means for transmitting said position information assigned to each item of contents and a classification category of the item of contents to an exterior via a network.

30. The apparatus as claimed in claim 27, wherein a range of items of contents of which said position information and said classification categories are transmitted is expanded or reduced in a continuous manner in response to a user request.

31. The apparatus as claimed in claim 28, wherein a range of items of contents of which said position information and said classification categories are transmitted is expanded or reduced in a continuous manner in response to a user request.

32. The apparatus as claimed in claim 29, wherein a range of items of contents of which said position information and said classification categories are transmitted is expanded or reduced in a continuous manner in response to a user request.

33. A computer program that causes a computer to map contents comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

adjusting the calculated distance based on the classification information of said two items of contents by multiplying the calculated distance by the adjustment coefficient so that the calculated distance is reduced to such an extent that the closer said two items of the contents are to each other the more nearly the assigned classification information of said two items of contents match each other; and assigning each item of contents the position information in the predetermined dimensional space based on the adjusted distance, wherein said adjustment coefficient is calculated using a distance matrix of which size is determined by the number of the classification categories in the lowest level down to which classification categories of said two items of contents match.

34. A computer program that causes a computer to map contents comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

mapping each item of contents in the predetermined dimensional space based on the distance; and adjusting the mapping based on the classification information of said two items of contents by multiplying the calculated distance by the adjustment coefficient so that the distance between two items of the contents is reduced to such an extent that the closer said two items of the contents are to each other the more nearly the assigned classification information of said two items of contents match each other, wherein said adjustment coefficient is calculated using a distance matrix of which size is determined by the number of the classification categories in the lowest level down to which classification categories of said two items of contents match.

35. A computer program that causes a computer to map contents comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

adjusting the calculated distance based on the classification information of said two items of contents by multiplying the calculated distance by the adjustment coefficient so that the calculated distance is reduced to such an extent that the closer said provided classification information and the assigned the two items of the contents are to each other the more nearly the assigned classification information of said two items of contents match each other;

assigning each item of contents the position information in the predetermined dimensional space based on the adjusted distance; and further adjusting the mapping based on the classification information of said two items of contents so that the distance between two items of the contents is reduced to such an extent that the two items of the contents are close to each other with respect to the assigned classification information, wherein said adjustment coefficient is calculated using a distance matrix of which size is determined by the number of the classification categories in the lowest level down to which classification categories of said two items of contents match.

36. A computer readable recording medium storing thereto a computer program that causes a computer to map contents, comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

adjusting the calculated distance based on the classification information of said two items of contents by multiplying the calculated distance by the adjustment coefficient so that the calculated distance is reduced to such an extent that the closer said two items of the contents are to each other the more nearly the assigned classification information of said two items of contents match each other; and assigning each item of contents the position information in the predetermined dimensional space based on the adjusted distance, wherein said adjustment coefficient is calculated using a distance matrix of which size is determined by the number of the classification categories in the lowest level down to which classification categories of said two items of contents match.

37. A computer readable recording medium storing thereto a computer program that causes a computer to map contents, comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

mapping each item of contents said position information in the predetermined dimensional space based on the distance; and adjusting the mapping based on the classification information of said two items of contents by multiplying the calculated distance by the adjustment coefficient so that the distance between two items of the contents is reduced to such an extent that the closer said two items of the contents are to each other the more closer the assigned classification information of said two items of contents match each other, wherein said adjustment coefficient is calculated using a distance matrix of which size is determined by the number of the classification categories in the lowest level down to which classification categories of said two items of contents match.

38. A computer readable recording medium storing thereto a computer program that causes a computer to map contents, comprising:

providing each item of the contents with classification information comprising a plurality of hierarchical levels;

assigning each item of the contents a concept vector; and mapping each item of the contents in a predetermined dimensional space based on the provided classification information and the assigned concept vector;

wherein the mapping comprises:

calculating a distance between two items of contents based on the concept vectors assigned thereto;

calculating an adjustment coefficient based on how nearly the classification information of said two items of contents match each other;

adjusting the calculated distance based on the classification information of said two items of contents by multiplying the calculated distance by the adjustment coefficient so that the calculated distance is reduced to such an extent that the closer said two items of the contents are to each other the more nearly the assigned classification information of said two items of contents match each other;

assigning each item of contents the position information in a low dimensional space based on the adjusted distance; and adjusting the mapping based on the classification information of said two items of contents so that the distance between two items of the contents is reduced to such an extent that the two items of the contents are close to each other with respect to the assigned classification information, wherein said adjustment coefficient is calculated using a distance matrix of which size is determined by the number of the classification categories in the lowest level down to which classification categories of said two items of contents match.

* * * * *